(12) United States Patent
Demick et al.

(10) Patent No.: US 10,683,712 B2
(45) Date of Patent: Jun. 16, 2020

(54) SYSTEM AND METHOD FOR MONITORING CABLE LIFE

(71) Applicant: Caterpillar Inc., Peoria, IL (US)

(72) Inventors: Christopher J. Demick, Howe, TX (US); Rex Glover, Deer Creek, IL (US)

(73) Assignee: Caterpillar Inc., Peoria, IL (US)

( * ) Notice: Subject to any disclaimer, the term of this patent is extended or adjusted under 35 U.S.C. 154(b) by 221 days.

(21) Appl. No.: 15/873,072

(22) Filed: Jan. 17, 2018

(65) Prior Publication Data
US 2019/0218902 A1    Jul. 18, 2019

(51) Int. Cl.
| | |
|---|---|
| *E21B 19/08* | (2006.01) |
| *E21B 47/00* | (2012.01) |
| *E21B 19/00* | (2006.01) |
| *G01B 5/02* | (2006.01) |
| *B66D 1/00* | (2006.01) |
| *E21B 19/02* | (2006.01) |
| *G01B 21/06* | (2006.01) |
| *E21B 7/02* | (2006.01) |
| *G01B 21/32* | (2006.01) |
| *E21B 19/086* | (2006.01) |

(52) U.S. Cl.
CPC .............. *E21B 19/08* (2013.01); *B66D 1/00* (2013.01); *E21B 7/022* (2013.01); *E21B 19/00* (2013.01); *E21B 19/008* (2013.01); *E21B 19/02* (2013.01); *E21B 47/0006* (2013.01); *G01B 5/02* (2013.01); *G01B 21/06* (2013.01); *E21B 7/02* (2013.01); *E21B 19/086* (2013.01); *G01B 21/32* (2013.01)

(58) Field of Classification Search
CPC . E21B 7/02; E21B 7/022; E21B 19/00; E21B 19/008; E21B 19/02; E21B 19/08; E21B 19/086; E21B 43/12; E21B 43/121; E21B 43/126; E21B 43/128
See application file for complete search history.

(56) References Cited

U.S. PATENT DOCUMENTS

| | | | |
|---|---|---|---|
| 4,321,836 A * | 3/1982 | Toalson | E21B 19/008 73/862.44 |
| 4,755,805 A * | 7/1988 | Chau | E21B 17/003 340/649 |
| 6,095,501 A | 8/2000 | Vatne | |
| 6,257,349 B1 | 7/2001 | Bardwell | |
| 6,672,410 B2 | 1/2004 | Smith | |
| 7,138,925 B2 | 11/2006 | Nield | |
| 7,220,449 B2 | 5/2007 | Schachtely et al. | |
| 8,622,151 B2 | 1/2014 | Ledbetter | |
| 8,776,627 B2 | 7/2014 | Heffner | |
| 8,997,892 B2 | 4/2015 | Strange | |
| 2004/0221985 A1 | 11/2004 | Hill et al. | |

(Continued)

*Primary Examiner* — Tara E Schimpf
(74) *Attorney, Agent, or Firm* — Bookoff McAndrews

(57) ABSTRACT

A method for monitoring a cable of an implement system. The implement system includes a drilling device, a tensioning device and the cable, the cable coupled to the drilling device and the tensioning device in a taut configuration to define a first length. The method includes determining, by a controller, an increment in the first length of the cable. The method further includes comparing, by the controller, the increment in the first length with a threshold value; and generating, by the controller, a warning signal if magnitude of the increment is greater than the threshold value.

20 Claims, 8 Drawing Sheets

(56) References Cited

U.S. PATENT DOCUMENTS

| | | | |
|---|---|---|---|
| 2009/0283259 A1* | 11/2009 | Poitzsch | E21B 43/26 166/250.01 |
| 2011/0220420 A1 | 9/2011 | Connell | |
| 2016/0131128 A1* | 5/2016 | Doyle | E21B 43/127 74/36 |
| 2016/0182798 A1 | 6/2016 | Thorn et al. | |
| 2016/0251869 A1* | 9/2016 | Deel | E21B 15/00 52/116 |
| 2019/0203575 A1* | 7/2019 | Schlosser | B66D 1/505 |

\* cited by examiner

SYSTEM AND METHOD FOR MONITORING CABLE LIFE

TECHNICAL FIELD

The present disclosure generally relates to a machine having an implement system. More particularly, the present disclosure relates to system and method for monitoring life of a cable of the implement system.

BACKGROUND

Drilling machines may include a drilling apparatus which may include, in part, a drill head configured to engage a work surface at a worksite. The drilling apparatus may include cables, which may be used, along with other components of the drilling apparatus, to facilitate the movement and/or positioning of the drill head, and may further facilitate the engagement between the drill head and the surface which the drill head may be acting upon. However, such cables may wear, may stretch, and may fail due to factors and/or conditions including but not limited to the cables experiencing repeated use over time, which may lead to loss of productivity due to machine downtime and in some cases may even cause damage to other components of the drilling apparatus.

U.S. Pat. No. 7,138,925 B2 to Nield (hereinafter, "the '925 patent") to relates to relates to microprocessor controlled circuits and signals responsive to the proximity or distance of an object coming too close to or moving too far from another object, and is useful for setting, controlling and displaying travel limits and ton-mile data of hoist equipment used on cranes, general hoists and drill rigs. In particular, the '925 patent discloses a multi-function cable hoist system controller which monitors a variety of drilling rig hoist system functions, including, positioning of the hoist block of the hoist system, speed/momentum of the hoist block, and hoist block loading. The controller can also monitor cable ton-mile parameters, weight on the drill bit, and drill bit penetration rate monitor. The controller automatically controls operation of the hoist system's draw-works when the system's operation exceeds certain preset and user specified parameters.

SUMMARY OF THE INVENTION

In an aspect of the present disclosure, a method for monitoring a cable of an implement system is disclosed. The implement system includes a drilling device, a tensioning device and the cable. The cable is coupled to the drilling device and the tensioning device in a taut configuration to define a first length. The method includes determining, by a controller, an increment in the first length of the cable. The method further includes comparing, by the controller, the increment in the first length with a threshold value and generating, by the controller, a warning signal if magnitude of the increment is greater than the threshold value.

In another aspect of the present disclosure, an implement system for a drilling machine is disclosed. The implement system includes a drilling device, a tensioning device, a cable coupled to the drilling device at one end and the tensioning device at other end in a taut configuration to define a first length. The cable is configured to move the drilling device with respect to a ground surface. The implement system further includes a sensor positioned on the tensioning device and in communication with the cable. The sensor is configured to detect one or more parameters associated with the cable. The implement system also includes a controller that is communicably coupled to the sensor and is configured to determine an increment in the first length of the cable, compare the increment in the first length with a threshold value and generate a warning signal if magnitude of the increment is greater than the threshold value.

In yet another aspect of the present disclosure, a drilling machine is disclosed. The drilling machine includes a frame, a mast mounted on the frame, a rotary head movable along the mast, a drilling tool coupled to the rotary head. The drilling tool is configured to rotate on being engaged by the rotary head. The drilling machine further includes one or more cables coupled to the rotary head for moving the rotary head relative to the mast and one or more tensioning devices coupled to the one or more cables. The one or more tensioning devices are configured to remove slack created in the one or more cables. The drilling machine further includes a sensor communicably coupled with the one or more cables. The sensor is configured to detect one or more parameters associated with each cable of the one or more cables. The drilling machine further includes a controller that is communicably coupled to the sensor and is configured to determine an increment in length of each cable based on the one or more parameters associated with each cable, compare the increment in length of each cable with a threshold value and generate a warning signal if the increment in length of at least one cable of the one or more cables is greater than the threshold value.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
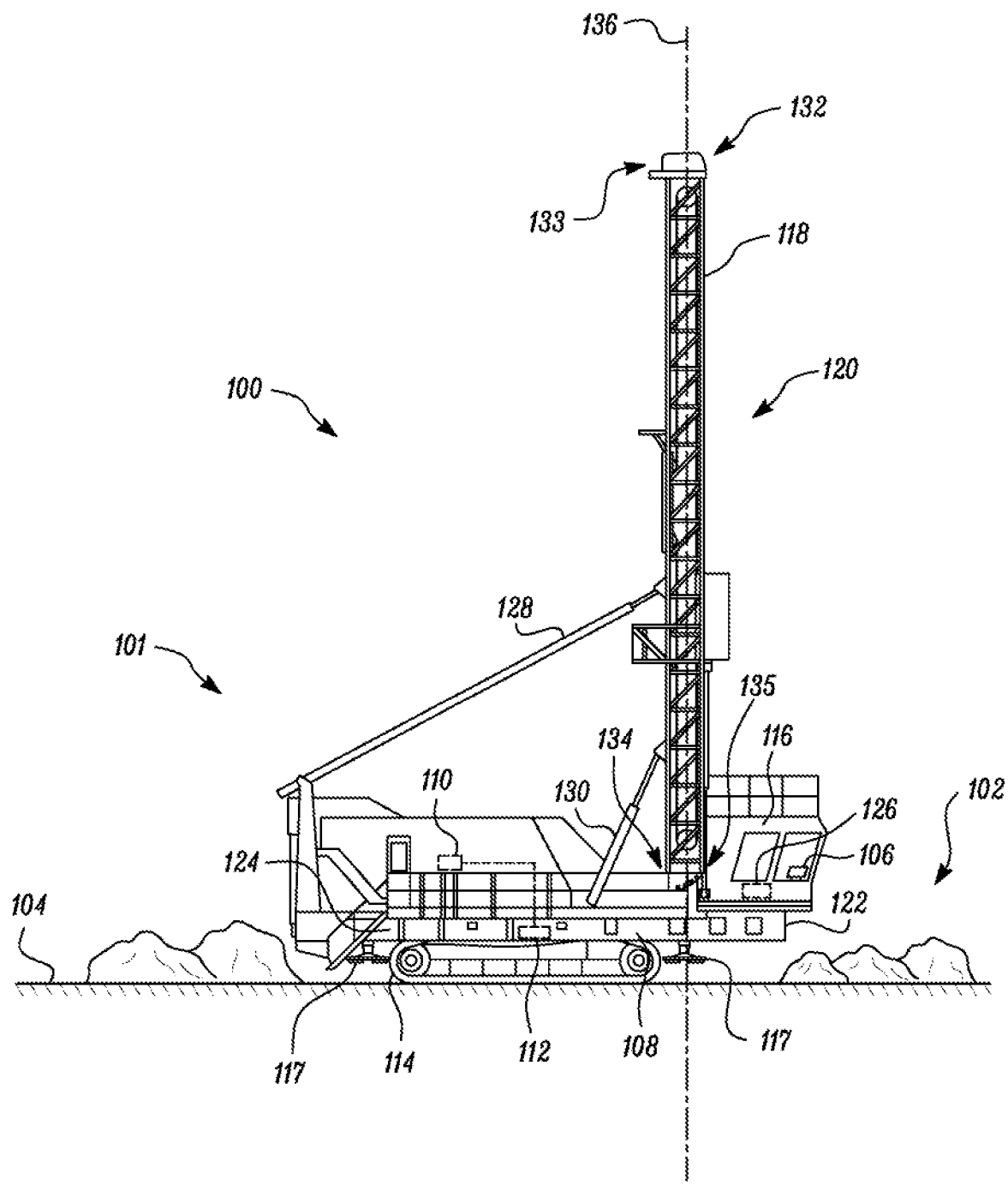
FIG. 1 is a diagrammatic illustration of a machine operating at a worksite, in accordance with an embodiment of the present disclosure.

FIG. 1 illustrates a machine 100 operating at a worksite 102. In particular, to provide one non-limiting example of a machine 100 in which embodiments of the present disclosure can be implemented, the machine 100 shown in FIG. 1 is depicted as a drilling machine 101, such as a rotary drill or a blast hole drill, used for drilling or otherwise forming holes, channels, tunnels or openings into, within, and/or extending into and/or below a work surface 104 of the worksite 102, including but not limited to soil, sediment, sand, rock, or any other work surface 104 for any of a variety of applications in which penetration of a surface via a drill can be utilized as necessary or beneficial, including but not limited to for, or in connection with, sub-surface mineral extraction, such as, e.g., oil or natural gas; mineral exploration or environmental exploration drilling; hydraulic fracturing; oil, gas, and/or water extraction wells; rock cut drilling for mining and/or quarrying operations; and the like. However, it should be understood that the spirit and scope of the present disclosure includes any machine 100, machine system, or application which can implement the system and method for monitoring cable life according to any embodiment of the present disclosure, including but not limited to types of drilling machines which can vary from the drilling machine 101 illustrated in FIG. 1, and additionally, or alternatively, any other type of machine which can implement the system and method for monitoring cable life according to any embodiment of the present disclosure for any of a variety of applications and/or contexts.

In the embodiment illustrated, the machine 100 is an operator operated machine. However, in various other embodiments, the machine 100 can be a machine have varying levels of autonomy. For instance, the machine 100 can be an autonomous machine, a semiautonomous machine, a remotely operated machine, or a remotely supervised machine.

Figure 2:
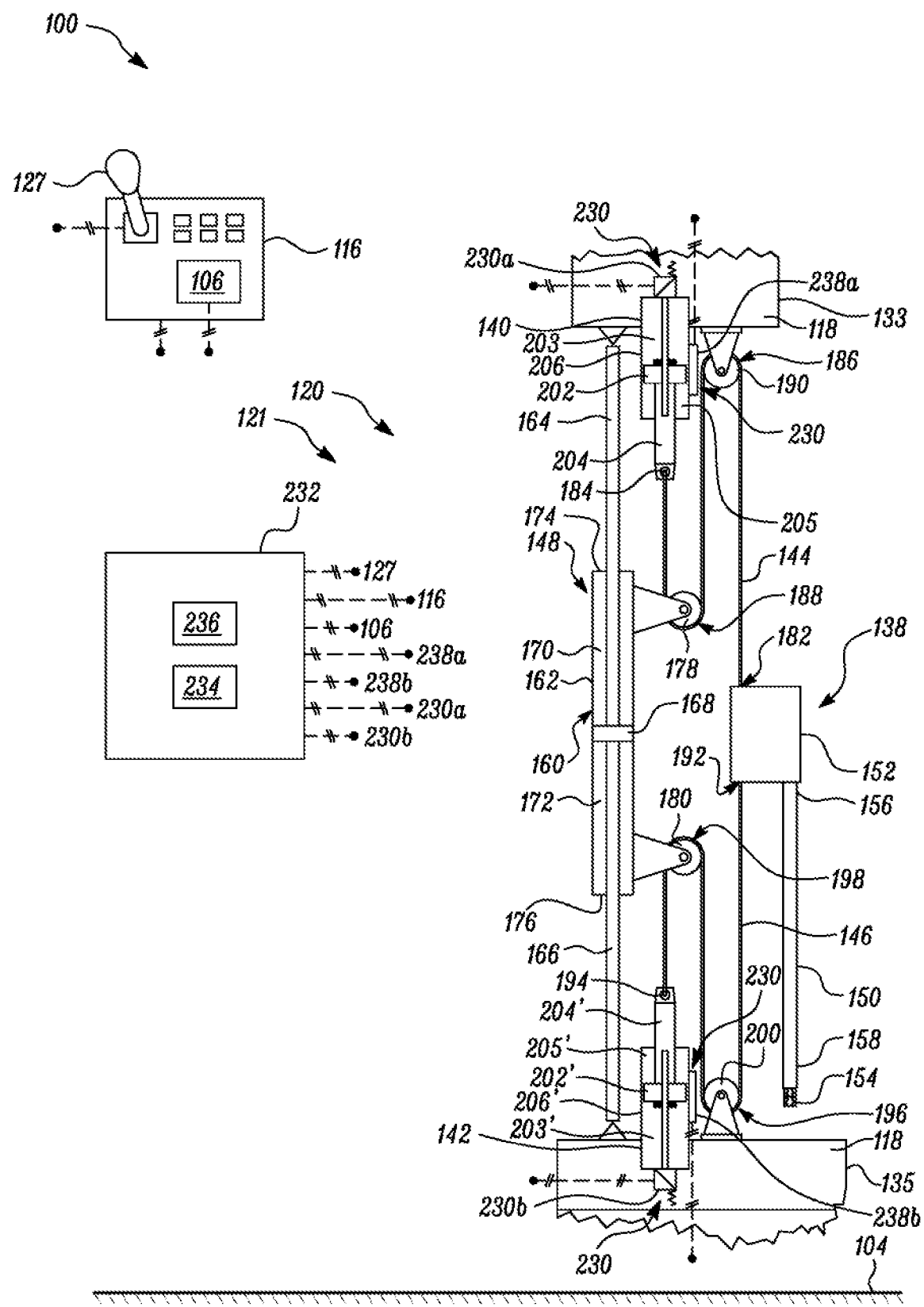
FIG. 2 illustrates a portion of an implement system mounted on the machine, in accordance with an embodiment of the present disclosure.

The machine 100 includes a frame 108, a power source 110 an operator station 116, a mast 118 and an implement system 120 (illustrated in FIG. 2). The power source 110 can be any suitable power source or system capable of generating and/or supplying power to operate the machine 100 (as well as the systems and components thereof, as disclosed herein), including but not limited to a diesel engine, a gasoline engine, a gaseous fuel-powered engine, an electrical motor, a fuel cell, a battery, and/or combinations thereof. The power source 110 can be mounted on the frame 108, and in the exemplary embodiment shown in FIG. 1, the power source 110 is be mounted on a front frame section 124 of the machine 100.

In embodiments wherein the machine 100 is a land based (e.g., non-marine) and further is a mobile machine 100 such as the exemplary drilling machine 101 shown in FIG. 1, the machine 100 can further include a transmission system 112 and two or more ground engaging propulsion members 114. The transmission system 112 can be mounted on the frame 108 and further can be positioned on the frame 108 proximate to the power source 110 such that the transmission system 112 can be mechanically coupled thereto. In the exemplary embodiment shown in FIG. 1, the transmission system 112 is mounted on the front frame section 124. The frame 108 of the machine 100 as embodied as a mobile machine 100 (e.g., the exemplary drilling machine 101) is attached to the two or more ground engaging propulsion members 114 which support the frame 108 above, and engage, the work surface 104 to effectuate one or more of movement, turning, positioning, and travel of the machine 100 on the work surface 104, as further discussed herein. In the exemplary embodiment illustrated in FIG. 1, the two or more ground engaging propulsion members 114 are embodied as a pair of endless track assemblies on opposing sides of the machine 100 (it is to be understood that although only one ground engaging propulsion member 114 embodied as an endless track assembly is shown in FIG. 1, an additional, identical endless track assembly is included on the opposing side of the machine 100, as known in the art). However, it should be understood that the two or more ground engaging propulsion members 114 can alternatively be embodied as two or more wheels or any other suitable devices capable of effectuating one or more of movement, turning, positioning, and travel of the machine 100. The transmission system 112 can be mechanically, or otherwise operatively, connected to the power source 110 and the two or more ground engaging propulsion members 114 to effectuate and control the transmission of power from the power source 110 to the two or more ground engaging propulsion members 114 such that the two or more ground engaging propulsion members 114 are rotatably or otherwise movably engaged and actuated to propel the machine 100 to effectuate one or more of movement, turning, positioning, and travel of the machine 100 on the work surface 104 of the worksite 102. The transmission system 112 can be any transmission or similar system, such as a mechanical, hydromechanical, hydrodynamic, hydrostatic, continuously variable, infinitely variable, electric, or any other suitable transmission system which can be selected based on factors including but not limited to the configuration, type, and/or application requirements of the power source 110, the two or more ground engaging propulsion members 114, and/or the machine 100, and can include gears, clutches, shafts, belts, and/or any other suitable components based upon and specific to the type of transmission system 112 implemented within the machine 100. The machine 100 can also include jacks 117. The jacks 117 can be configured to support/stabilize the machine 100 on the work surface 104 during working/drilling mode of operation of the machine 100. Although jacks 117 are illustrated in the embodiment shown in FIG. 1 as included in the machine 100 embodied as a mobile, drilling machine 101, jacks 117 can also be included in alternative embodiments wherein the machine 100 is a stationary or non-independently mobile machine 100.

With continued reference to FIG. 1, the frame 108 of the machine 100 includes a rear frame section 122 and the front frame section 124 in various embodiments (non-mobile, mobile, etc.) of the machine 100. In an embodiment, the jacks 117 are attached to the frame 108, and, in one example, can be actuatably coupled to the rear frame section 122 and the front frame section 124, and, upon actuation, the jacks 117 are configured to extend from the frame 108 to engage the work surface 104 to support/stabilize the machine 100 on the work surface 104 as can be required or beneficial in connection with various operations and/or uses of the machine 100, including but not limited to during working/drilling mode of operation of the machine 100, as further discussed herein. The operator station 116 is located/coupled/mounted on the frame 108, and in the embodiment shown in FIG. 1, the operator station 116 is located/coupled/mounted on the rear frame section 122. The operator station 116 can include an operational control system 126, which can include one or more control devices 127 which can include and be embodied as any one or more of one or more joysticks, pedals, levers, buttons, steering wheels, and any other suitable control device or interface (or any of various combinations thereof) configured to be actuated or otherwise engaged to effectuate control of the machine 100 as well as the various systems and components thereof according to any of the embodiments, as disclosed herein, including, in part, to engage the operation of the machine 100 according a plurality of particular modes of operation for the machine 100, which can include, in part, a working/drilling mode of operation. In embodiments wherein the machine 100 is a mobile machine 100, including the exemplary drilling machine 101 shown in FIG. 1, the machine 100 can include two or more modes of operation, including, in pan, a working mode or a travelling mode, which can be actuated, selected, commanded, and/or engaged via the operational control system 126. The operator station 116 can also include a display unit 106 for displaying visual data pertaining to the components and/or the current operations of the machine 100 to an operator stationed within the operator station 116. The display unit 106 can include a Light Emitting Diode (LED) display, an Edge LED display, a Thin Film Transistor (TFT) display, a Liquid Crystal Display (LCD) display, and/or the like. In one embodiment, the display unit 106 can additionally be included as a control device 127 of the operational control system 126, wherein the display unit 106 can be embodied as an input and display unit as including the functionalities, capabilities, and interface format of a tablet computing device (or otherwise consistent therewith), and can be connected in electronic communication with a controller 232 (as further disclosed herein with reference to FIG. 2) such that, through the display unit 106, the operator can interact with, control, and/or operate the various systems of the machine 100 including but not limited to the implement system 120 and a cable monitoring system 121 (as further disclosed herein with reference to FIG. 2) thereof (including but not limited to entering information, providing inputs, adjusting parameters, and the like), and additionally can receive and transmit information, notifications, and alerts from the various systems of the machine 100 including but not limited to the cable monitoring system 121 thereof which can include one or more of textual or visual alerts, audio alerts, and/or tactile/vibrational alerts displayed, output, or otherwise provided to the operator via the display unit 106, as disclosed further herein.

As illustrated in FIG. 1, the mast 118 is mounted on the frame 108 of the machine 100. The mast 118 (also referred to as a derrick or tower) can be movable relative to the frame 108 between a substantially vertical position and a non-vertical position via use of a first mast lift cylinder 128 and a second mast lift cylinder 130. Varying the position of the mast 118 (via the first mast lift cylinder 128 and the second mast lift cylinder 130) will vary the angle of drilling. The mast 118 is a linearly-extending structure, and in the exemplary embodiment and configuration of the machine 100 illustrated in FIG. 1, is an upright structure, extending along a longitudinal axis 136 and can include a top end 132, generally referred to as 'crown', and a bottom end 134, generally referred to as the 'mast base'. The implement system 120 can be mounted on the mast 118 of the machine 100, and as shown in FIG. 1 and as further illustrated in FIGS. 2-7, the implement system 120 can be positioned between, and can be mounted or otherwise attached to, (or when oriented in the upright position as illustrated in FIG. 1) an upper mounting structure 133 of the mast 118, and (or when oriented in the upright position as illustrated in FIG. 1) a lower mounting structure 135 of the mast 118, wherein the first or upper mounting structure 133 and the second or lower mounting structure 135 can be located at, or are otherwise oriented proximate to, the top end 132 and the bottom end 134 of the mast 118, respectively. The implement system 120 includes a drilling device 138, a first tensioning device 140, a second tensioning device 142, a first cable 144, a second cable 146 and a cable feed system 148, as illustrated in FIG. 2.

The drilling device 138 can include a drill pipe 150, a rotary drill head 152 and a drill bit 154. The drill pipe 150 can be a long straight section having a first pipe end 156 and a second pipe end 158. The first pipe end 156 can be coupled to the drill head 152 and the second pipe end 158 can extend outward from drill head 152 and can receive or otherwise include the drill bit 154 coupled thereto. As such, the second pipe end 158, including the drill bit 154, can be defined as the drilling end of the drill head 152. The drill head 152 can be configured to rotate the drill bit 154, via the drill pipe 150, to perform the drilling operation. The rotary drill head 152 can be actuated to move and/or travel up and down the mast 118 along the length thereof between the top end 132 and the bottom end 134 and/or be positioned at any of a plurality of positions therebetween, via a synergistic operation of the a first tensioning device 140, a second tensioning device 142, a first cable 144, a second cable 146 and a cable feed system 148 as well as the differences in mutually opposing forces exerted on opposing ends of the rotary drill head 152 by the same.

As discussed above, the implement system 120 also includes the cable feed system 148, as illustrated in FIG. 2. The cable feed system 148 includes a dual rod, single piston type hydraulic feed cylinder 160 having a cylinder body 162, a first piston rod 164, a second piston rod 166, and a common piston 168. The first piston rod 164 and the second piston rod 166 can be attached to the common piston 168 and slidably disposed within the cylinder body 162. Furthermore, in one embodiment, the dual rod, single piston type hydraulic feed cylinder 160 can be positioned between the upper mounting structure 133 and the lower mounting structure 135 of the mast 118, wherein the first piston rod 164 can extend outwardly from the common piston 168 and the cylinder body 162 to an opposing end coupled to the upper mounting structure 133, and the second piston rod 166 can extend outwardly from the common piston 168 and the cylinder body 162 to an opposing end coupled to the lower mounting structure 135. The common piston 168 defines an upper chamber 170 and a lower chamber 172 within the cylinder body 162. The hydraulic feed cylinder 160 also includes a top feed cylinder end 174 and a bottom feed cylinder end 176, wherein the top feed cylinder end 174 can be oriented toward the upper mounting structure 133 and/or the top end 132 of the mast 118, and the bottom feed cylinder end 176 can be oriented toward the lower mounting structure 135 and/or the bottom end 134 of the mast 118.

The cable feed system 148 can also include a first sheave 178 or pulley as well as a second sheave 180 or pulley coupled to the hydraulic feed cylinder 160, and, in one embodiment, the cylinder body 162 thereof. The first sheave 178 can be coupled or attached to the top feed cylinder end 174 of the hydraulic feed cylinder 160. In particular, the first sheave 178 can be coupled or attached to the hydraulic feed cylinder 160 at, or alternatively, adjacent to the top feed cylinder end 174 thereof. Similarly, the second sheave 180 can be coupled or attached to the bottom feed cylinder end 176 of the hydraulic feed cylinder 160. In particular, the second sheave 180 can be coupled or attached to the hydraulic feed cylinder 160 at, or alternatively, adjacent to the bottom feed cylinder end 176 thereof. The first sheave 178 and the second sheave 180 can be configured to move between and travel linearly up and down, toward and away from the upper mounting structure 133 and the lower mounting structure 135, respectively, along with, in unison with, and by virtue of the actuation and corresponding movement of the hydraulic feed cylinder 160.

Figure 3:
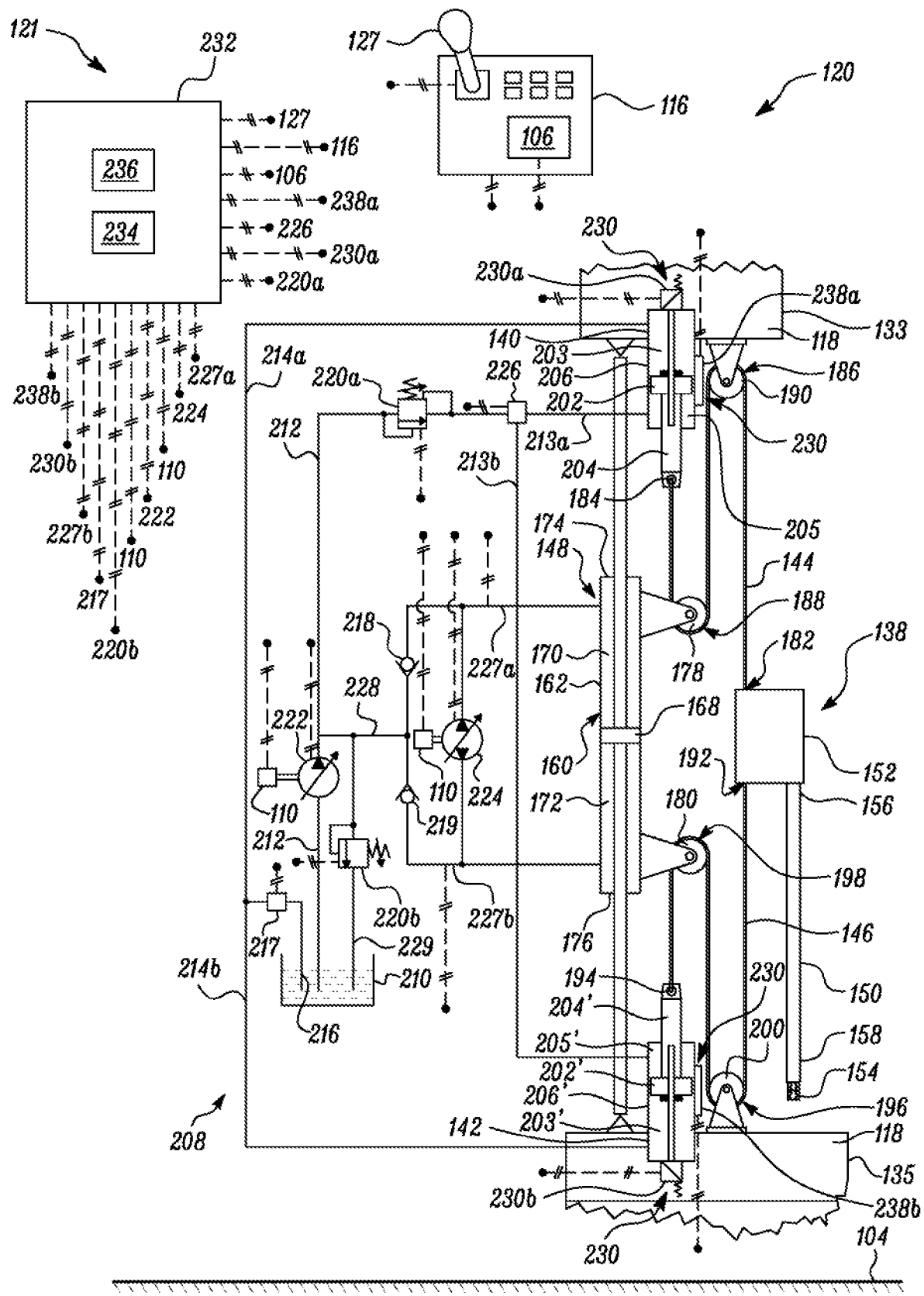
FIG. 3 illustrates the implement system having a hydraulic system, in accordance with an embodiment of the present disclosure.

Referring to FIG. 3, the first cable 144 can include a first end 182, a second end 184 on an end of the first cable 144 opposite the first end 182, a first intermediate portion 186 and a second intermediate portion 188. The first intermediate portion 186 and the second intermediate portion 188 can correspond to short length segments of the first cable 144, wherein the first intermediate portion 186 can be defined as a section or portion of the first cable 144 proximate to the first end 182, and the second intermediate portion 188 can be defined as a section or portion of the first cable 144 proximate to the second end 184 of the first cable 144. The first cable 144 can extend between the first end 182 and the second end 184 to define a first cable length 'L1'. The first end 182 can be coupled to the rotary drill head 152. The first intermediate portion 186 can be disposed on and/or extend through to be engaged with a first pulley 190 (coupled to the mast 118 oriented toward the top end 132 thereof, or additionally, or alternatively, coupled to the upper mounting structure 133 of the mast 118) such that the first intermediate portion 186 partially encircles the first pulley 190. The second intermediate portion 188 can extend through to be engaged with and can be at least partially encircling the first sheave 178 attached to the top feed cylinder end 174 of the hydraulic feed cylinder 160. The second end 184 can be coupled or attached to the first tensioning device 140 coupled to the upper mounting structure 133 of the mast 118 such that the first tensioning device 140 maintains the first cable 144 in a taut configuration or condition (i.e. in tensioned condition with no slack in the first cable 144). The first cable 144 can be a metallic cable, a braid of high tensile strength wires, a composite cable, or any other suitable cable known in the art.

Similarly, the second cable 146 can include a first end 192, a second end 194 on an end of the second cable 146 opposite the first end 192, a first intermediate portion 196 and a second intermediate portion 198. The first intermediate portion 196 and the second intermediate portion 198 can correspond to short length segments of the second cable 146, wherein the first intermediate portion 196 can be defined as a section or portion of the second cable 146 proximate to the first end 192 of the second cable 146, and the second intermediate portion 198 can be defined as a section or portion of the second cable 146 proximate to the second end 194 of the second cable 146. The second cable 146 can extend between the first end 192 and the second end 194 to define a second cable length 'L2'. In one embodiment, prior to use, upon installation, and/or during operating conditions under which neither of the first cable 144 or the second cable 146 have experienced stress, loads, or other conditions which result in stretching, as further discussed herein, the second cable length 'L2' of the second cable 146 is equivalent to the first cable length 'L1' of the first cable 144. The first end 192 of the second cable 146 can be coupled and/or attached to the rotary drill head 152, wherein, in one embodiment, the first end 192 of the second cable 146 can be coupled and/or attached to the rotary drill head 152 on a side, end, or position of the rotary drill head 152 which can be opposite that to which the first end 182 of the first cable 144 is attached, or is otherwise attached to the rotary drill head 152 such that the first end 192 of the second cable 146 exerts a force on the rotary drill head 152 in a direction which opposes that which the first end 182 of the first cable 144 exerts upon the rotary drill head 152. The first intermediate portion 196 of the second cable 146 can be disposed on and/or extend through to be engaged with a second pulley 200 (coupled to the mast 118 oriented toward the bottom end 134 thereof, or additionally, or alternatively, coupled to the lower mounting structure 135 of the mast 118) such that the first intermediate portion 196 of the second cable 146 partially encircles the second pulley 200. The second intermediate portion 198 can be disposed on and/or can extend through to be engaged with the second sheave 180 attached to the bottom feed cylinder end 176 of the hydraulic feed cylinder 160 such that the second intermediate portion 198 partially encircles the second sheave 180. The second end 194 of the second cable 146 can be coupled to the second tensioning device 142 coupled to the lower mounting structure 135 of the mast 118 such that the second tensioning device 142 maintains the second cable 146 in the taut configuration or condition (i.e. in tensioned condition with no slack in the second cable 146). The second cable 146 can also be one of a metallic cable, a braid of high tensile strength wires, a composite cable, or any other suitable cable known in the art.

The taut configuration of the first cable 144 and the second cable 146 can be imparted by the first tensioning device 140 and the second tensioning device 142 respectively. The first tensioning device 140 and the second tensioning device 142 are actuatably attached to the first cable 144 and the second cable 146, and more particularly, the (second) ends 184, 194, thereof, respectively. In particular, each of the first tensioning device 140 and the second tensioning device 142 include at least one element which is attached to the (second) ends 184, 194 of the first cable 144 and the second cable 146, respectively, and is actuated to move (e.g., to retract) to adjust the tension of the first cable 144 and the second cable 146 respectively, to thereby, maintain the first cable 144 and the second cable 146 in the taut condition (i.e. without any slack). It is to be noted that the moveable element of the first and second tensioning devices 140, 142 can also be actuated to extend to adjust the tension of the first and second cables 144, 146 respectively as may be required in some embodiments and/or applications. In the embodiment illustrated, the first tensioning device 140 is embodied as a hydraulic cylinder assembly having a piston 202, rod 204 and a cylinder 206, as illustrated in FIG. 3 as well as, at least in part, in FIGS. 2 and 4-7. The piston 202 can be disposed within the cylinder 206 and can be actuated to move linearly within the cylinder 206. The piston 202 can divide the cylinder 206 of the first tensioning device 140 into a first fluid chamber 203 and a second fluid chamber 205. The first cable 144 can be attached to the rod 204, and the rod 204 can be fixedly coupled to the movable piston 202 to move in unison therewith to correspondingly adjust the tension of the first cable 144. In particular, in the rod 204 can include a first end and an opposing second end, wherein the first end of the rod 204 can be attached to the movable piston 202 within the cylinder 206 and the first cable 144, and as illustrated, the second end 184 thereof, can be attached to the second end of the rod 204 which can extend outward from the cylinder 206. In the event that insufficient tension and/or an increased length (e.g., slack or looseness) is experienced by or present in the first cable 144 as further discussed herein, the piston 202 and rod 204 can be configured or actuated to move or retract within, and, at least in part, into, respectively, the cylinder 206 at a degree and/or distance equivalent to that required to maintain the adequate or required tension and/or the increased length of the first cable 144 such that the retraction of the rod 204 pulls the first cable 144 toward the upper mounting structure 133 of the mast 118 and imparts the adequate or required tension in the first cable 144. The pulling effect can be facilitated by a hydraulic system 208 of the implement system 120 (operation and components of which will be described in detail later in the present disclosure).

In the exemplary embodiment shown in FIGS. 2-7, consistent with the first tensioning device 140 as described above, the second tensioning device 142 is also embodied as a hydraulic cylinder assembly including a piston 202', rod 204' and a cylinder 206', wherein the piston 202' divides the cylinder 206' of the second tensioning device 142 into a first fluid chamber 203' and a second fluid chamber 205', and a first end of the rod 204' is fixedly coupled to the movable piston 202' to move in unison therewith. As such, given that the elements, components, functionality, and operation of the second tensioning device 142 is equivalent to that of the first tensioning device 140 as described above, the description of the first tensioning device 140 applies in an equivalent manner to that of the second tensioning device 142, namely, and correspondingly, that the second end 194 of the second cable 146 is attached to the second end of the rod 204' which can extend outward from the cylinder 206', and that actuation of the piston 202' and rod 204' to move or retract within the cylinder 206' pulls the second cable 146 toward the lower mounting structure 135 of the mast 118 to impart the adequate or required tension in the second cable 146. It is to be understood that the first tensioning device 140 and the second tensioning device 142 are shown as hydraulic cylinder assemblies to provide one non-limiting example of tensioning devices which can be utilized for the present disclosure. As such, it is further to be understood that one or more of the first and second tensioning devices 140, 142 can be any suitable device capable of being actuated to adjust the tension of the first cable 144 and the second cable 146 respectively, without departing from the spirit and scope of the present disclosure. In particular, an alternate embodiments, one or more of the first and second tensioning devices 140, 142 can include additional and/or alternative elements, components, configurations, and/or means of actuation, and various combinations thereof. For example, an alternate embodiments, one or more the first and second tensioning devices 140, 142 can be electrically actuated tensioning devices, electromechanically actuated tensioning devices, pneumatically actuated tensioning devices, or mechanically actuated tensioning devices, which may utilize solenoids, springs, motors, and/or any other suitable components.

As discussed above, the implement system 120 includes the cable feed system 148 as well as the hydraulic system 208 which is functionally integrated and configured to actuate, in part, the cable feed system 148 as well as the first and second tensioning devices 140, 142. The hydraulic system 208 includes a tank 210, a first pump 222, and a second pump 224, as well as the additional components, as disclosed herein.

Figure 4:
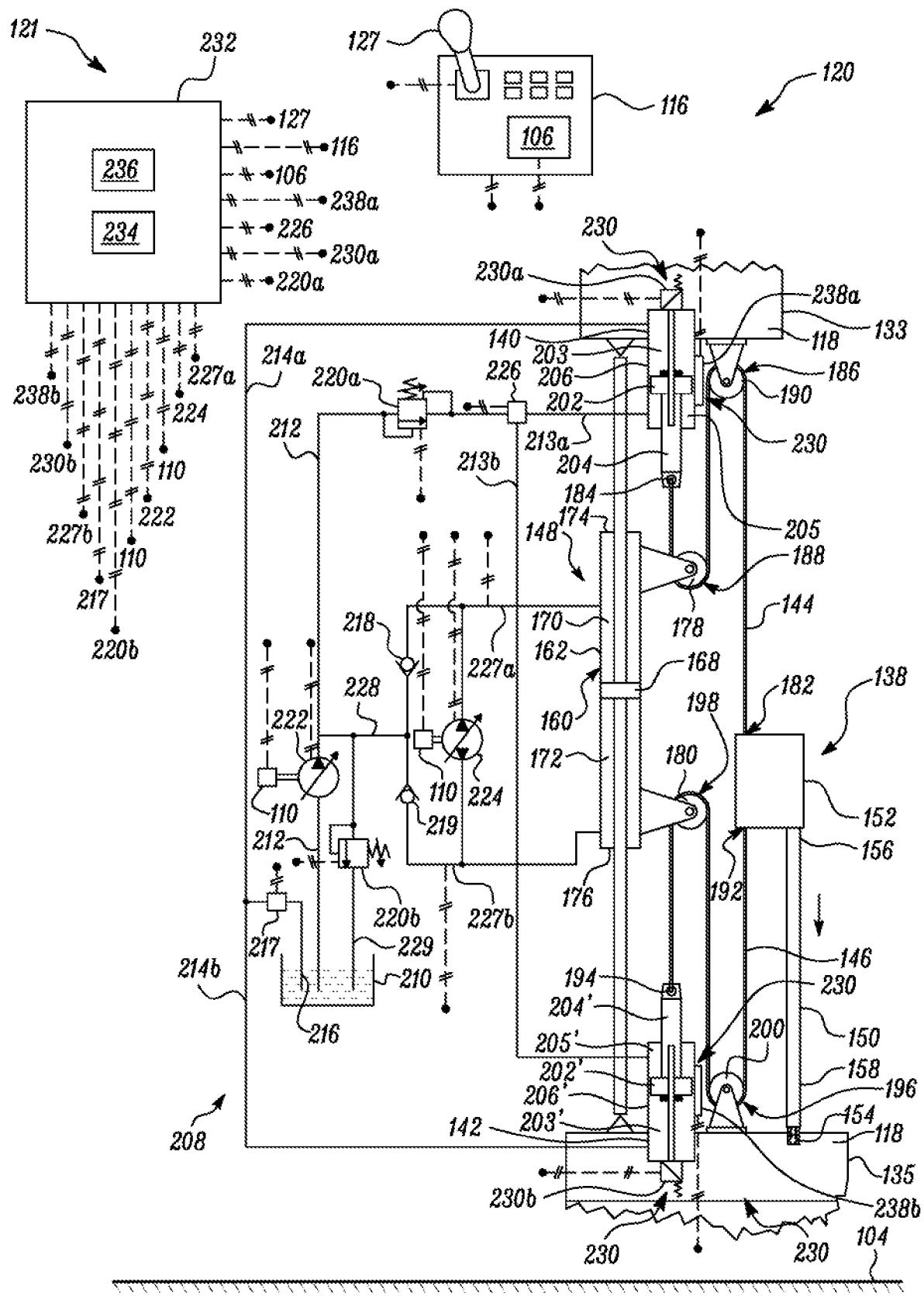
FIG. 4 illustrates a configuration of the implement system to lower a drilling device along a vertical direction, in accordance with an embodiment of the present disclosure.
Figure 5:
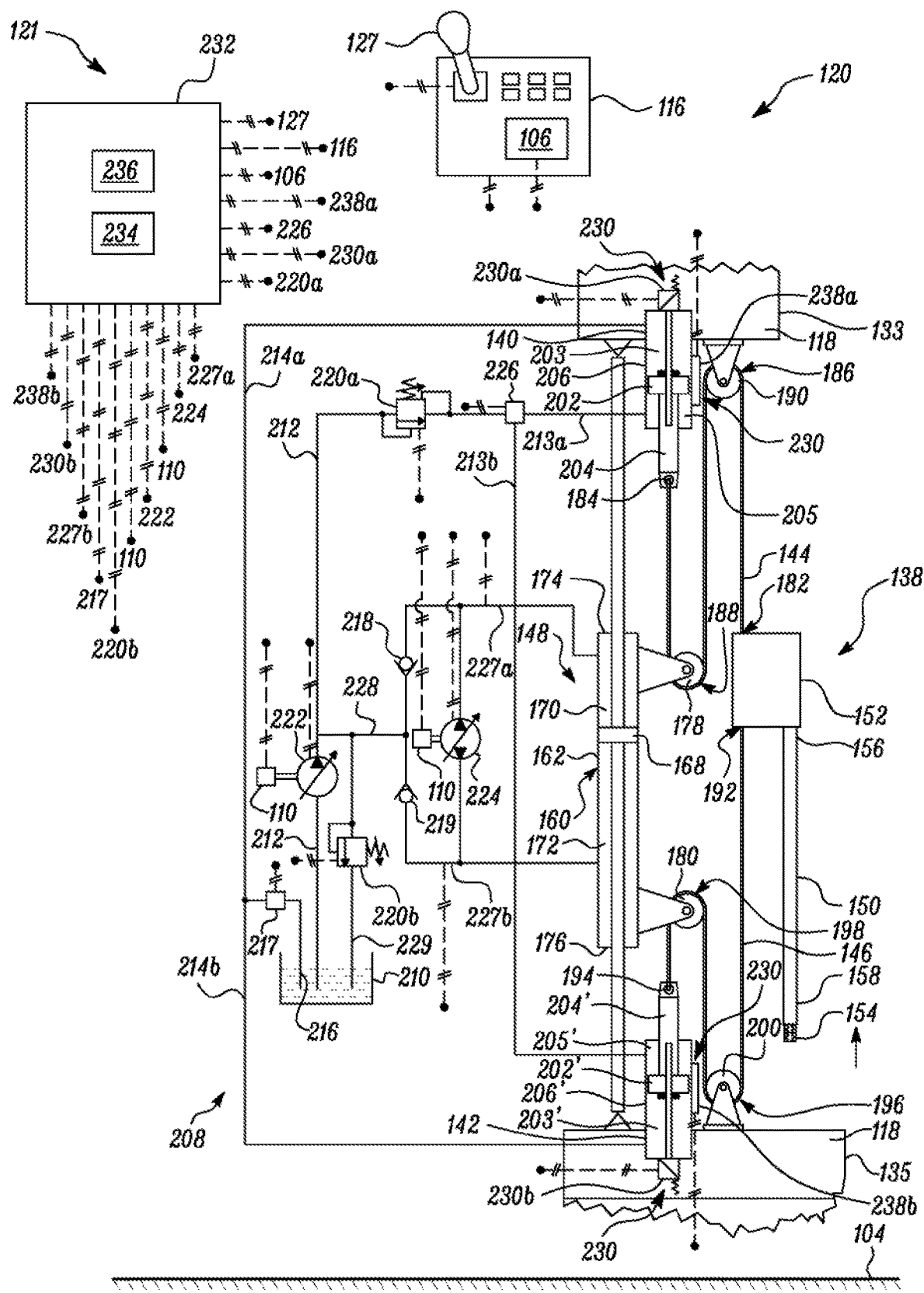
FIG. 5 illustrates a configuration of the implement system to lift the drilling device along the vertical direction, in accordance with an embodiment of the present disclosure.

Each of the first and second pumps 222, 224 can be operatively and mechanically coupled to the power source 110 (e.g., the engine) of the machine 100 such that the each of the first and second pumps 222, 224 is driven by the power source 110. The first pump 222 and second pump 224 can also be electronically and controllably connected to the controller 232, such that the operation and actuation of each of the first and second pumps 222, 224 can be controlled in response to one or more signals generated by the controller 232 and electronically transmitted to, and received by, the first and second pumps 222, 224, as further discussed herein. The first pump 222 and the second pump 224 can be functionally and fluidly integrated within the hydraulic system 208 to direct and/or supply a flow of hydraulic fluid, and in one or more embodiments, a pressurized flow of hydraulic fluid, through hydraulic system 208 to actuate the first and second tensioning devices 140, 142 and the cable feed system 148, respectively. A rotational speed of the first and second pump 222, 224 may define or control a flow rate of the hydraulic fluid delivered or output by each of the first and second pump 222, 224, and a displacement of the first and second pump 222, 224 may define or control a pressure of the hydraulic fluid delivered or output thereby. The hydraulic system 208 as illustrated in FIGS. 3-5 provides an exemplary, illustrative, and non-limiting depiction of one possible configuration of the fluid connections between the first and second pump 222, 224 and the first and second tensioning devices 140, 142 and the cable feed system 148, respectively. As such, it should be understood that additional and/or alternative configurations of the hydraulic system 208 are contemplated and are included as falling within the spirit and scope of the present disclosure. e.g., each of the first pump 222 and the second pump 224 can be separately and independently connected to draw hydraulic fluid from the tank 210, and the fluid connection of the second pump 224 to actuate the cable feed system 148, including, in part, the hydraulic feed cylinder 160 thereof, can be separate and independent from that of the first pump 222 and the first and second tensioning devices 140, 142.

The first pump 222 can be fluidly disposed within a first conduit 212 and positioned in fluid communication between the tank 210 to draw hydraulic fluid therefrom and supply a flow of pressurized hydraulic fluid to the first and second tensioning devices 140, 142, and, in particular, to supply a flow of pressurized hydraulic fluid to actuate and pressurize, and in one embodiment, to selectively actuate and pressurize, one or more of the second fluid chamber 205 of the first tensioning device 140 and the second fluid chamber 205' of the second tensioning device 142. In one or more embodiments, including that as illustrated in FIGS. 3-5, the first pump 222 can be embodied as a unidirectional, variable displacement hydraulic pump, such as an axial piston pump. In other embodiments, the first pump 222 can alternatively be embodied as a radial piston pump, a vane pump, a gear pump, a gerotor pump, or any other hydraulic pump or similar component capable of supplying a flow of pressurized hydraulic fluid capable of actuating the first and second tensioning devices 140, 142 in a manner consistent with the present disclosure.

The first pump 222 can be connected in fluid communication to fluidly direct and supply hydraulic fluid to the second fluid chamber 205 of the first tensioning device 140 via a second conduit 213a which extends in fluid communication between an end of the first conduit 212 downstream of the first pump 222 and the second fluid chamber 205 of the first tensioning device 140 to fluidly communicate and direct pressurized hydraulic fluid from the first pump 222 into the second fluid chamber 205 of the first tensioning device 140. Additionally, a third conduit 213b extends in fluid communication between the end of the first conduit 212 downstream of the first pump 222 and the second fluid chamber 205' of the second tensioning device 142 to fluidly communicate and direct pressurized hydraulic fluid from the first pump 222 into the second fluid chamber 205' of the second tensioning device 142. In one embodiment, one or more valves 226 can be connected in fluid communication with and fluidly disposed between the end of the first conduit 212 downstream of the first pump 222, the second conduit 213a, and the third conduit 213b. The one or more valves 226 can be any suitable, known hydraulic control device, devices, or any combination or configuration thereof capable of being actuated to selectively and controllably direct the flow and fluid communication of actuating hydraulic fluid from the first pump 222 to any one or more of the second fluid chamber 205 of the first tensioning device 140 and the second fluid chamber 205' of the second tensioning device 142. The one or more valves 226 can be connected in electronically controllable communication with the controller 232 and can be actuated to any one or more positions to selectively and controllably direct the flow and fluid communication of actuating hydraulic fluid from the first pump 222 into the second fluid chamber 205 of the first tensioning device 140 while blocking the flow of hydraulic fluid from being communicated into the second fluid chamber 205' of the second tensioning device 142, into the second fluid chamber 205' of the second tensioning device 142 while blocking the flow of hydraulic fluid from being communicated into the second fluid chamber 205 of the first tensioning device 140, and into both of the second fluid chambers 205, 205' of the first and second tensioning devices 140, 142, in response to and consistent with command signals generated by and received from the controller 232, as further discussed herein. In an additional embodiment, the one or more positions to which the one or more valves 226 can be actuated by the controller 232 can additionally include a position which can block the flow of hydraulic fluid from being communicated into both of the second fluid chambers 205, 205' of the first and second tensioning devices 140, 142. A pressure relief valve 220a may also be included and fluidly disposed within the first conduit 212 (downstream of the first pump 222) and configured to control or limit the pressure of the hydraulic fluid being transmitted to the second fluid chambers 205, 205' of the first and second tensioning devices 140, 142, respectively.

The hydraulic system 208 can also include a fourth conduit 214a connected in fluid communication with the first fluid chamber 203 of the first tensioning device 140 and a fifth conduit 214b connected in fluid communication with the first fluid chamber 203' of the second tensioning device 142. The fourth and fifth conduits 214a, 214b can be connected to receive and fluidly communicate the hydraulic fluid directed out of the first fluid chambers 203, 203' of the first and second tensioning devices 140, 142 via the movement of the respective pistons 202, 202' to the tank 210, which, in the embodiment shown in FIGS. 3-5 can be via a sixth conduit 216. In addition, in the exemplary embodiment shown in FIGS. 3-5, the ends of the fourth and fifth conduits 214a, 214b opposite those connected to the first fluid chambers 203, 203' can be connected in fluid communication to allow flow sharing between, and fluidly connect the first fluid chamber 203 of the first tensioning device 140 in fluid communication with the first fluid chamber 203' of the second tensioning device 142. Furthermore, in the exemplary embodiment shown in FIGS. 3-5, the sixth conduit 216 can extend between and connect the ends of the fourth and fifth conduits 214a, 214b opposite those connected to the first fluid chambers 203, 203' in fluid communication with the tank 210, and can include one or more valves 217 which can be any suitable, known hydraulic control device, devices, or any combination or configuration thereof capable of being actuated to open and permit the fluid communication of the hydraulic fluid from within the fourth and fifth conduits 214a, 214b to the tank 210 upon, e.g., the fluid exceeding a relief or pressure setting of the one or more valves 217 while maintaining a predefined, minimum pressure of hydraulic fluid within the first fluid chambers 203, 203', and further capable of opening or otherwise providing or allowing a regenerative flow of hydraulic fluid from within the tank 210 to be fluidly directed into one or more of the first fluid chambers 203, 203' from the tank 210.

As provided above, the second pump 224 can be fluidly connected to selectively supply a flow of pressurized hydraulic fluid to the upper chamber 170 or the lower chamber 172 of the hydraulic feed cylinder 160 to actuate the hydraulic feed cylinder 160 to thereby actuate the cable feed system 148 to control the positioning and movement of the drilling device 138, as discussed herein. In one or more embodiments, including that as illustrated in FIGS. 3-5, the second pump 224 can be embodied as a bidirectional, variable displacement hydraulic pump, such as an axial piston pump. In the exemplary embodiment shown in FIGS. 3-5, the second pump 224 can be fluidly connected between and positioned in fluid communication with the upper chamber 170 and the lower chamber 172 of the hydraulic feed cylinder 160 via a seventh conduit 227a and an eighth conduit 227b, respectively. The seventh conduit 227a and eighth conduit 227b can be connected to fluidly communicate the flow of hydraulic fluid between the upper chamber 170 of the hydraulic feed cylinder 160 and the second pump 224, and the lower chamber 172 of the hydraulic feed cylinder 160 and the second pump 224, respectively. An end of the seventh conduit 227a and an end of the eighth conduit 227b opposite of that fluidly connected to the upper chamber 170 of the hydraulic feed cylinder 160 and lower chamber 172 of the hydraulic feed cylinder 160, respectively, can be connected in fluid communication with a ninth conduit 228 which is connected in fluid communication with the first conduit 212 downstream of the first pump 222 and upstream of the second and third conduits 213a, 213b, as well as the valves 2208 and 226. As such, in the exemplary embodiment shown in FIGS. 3-5, the first pump 222, via the first conduit 212 and the ninth conduit 228, can supply pressurized hydraulic fluid from the tank 210 to the seventh conduit 227a, the eighth conduit 227b, as well as the second pump 224, and thus, in relation to the latter, can act as a charge pump. A first check valve 218 can be fluidly disposed within the seventh conduit 227a and a second check valve 219 can be fluidly disposed within the eighth conduit 227b in between the second pump 224 and the ninth conduit 228. Finally, a tenth conduit 229 can be connected in fluid communication with and fluidly connect the ninth conduit 228 with the tank 210. The tenth conduit 229 can include a pressure relief valve 220b fluidly positioned therein, and can be configured to act as a charge relief conduit.

As shown in FIGS. 2-7, the implement system 120 can also include a cable monitoring system 121, which can include, utilize, and/or functionally interact with one or more elements, components, and/or systems of the implement system 120 as well as the machine 100, including, in part, the controller 232. The implement system 120, and the cable monitoring system 121 thereof, further includes one or more sensors 230 (which includes sensors 230a, 230b, 238a, and 238b as discussed herein) positioned to sensingly engage the first and second cables 144, 146 as well as the first and second tensioning devices 140, 142 associated therewith, to detect signals, readings, and/or measurements indicative of the condition, operation, and physical and positional conditions, characteristics, and/or states of each of the first and second cables 144, 146 (and the first and second tensioning devices 140, 142), as well as forces experienced by each of the first and second cables 144, 146 (and the first and second tensioning devices 140, 142) during the operation thereof. The one or more sensors 230 are additionally connected in electronic communication with the controller 232 to electronically transmit the foregoing sensed signals, readings, and/or measurements of each of the first and second cables 144, 146 (as well as the first and second tensioning devices 140, 142 associated therewith) to the controller 232 for processing as further discussed herein. The one or more sensors 230 can include a first sensor 230*a* and a second sensor 230*b* coupled to sensingly engage the first cable 144 and the second cable 146, respectively, and detect one or more signals, readings, and/or measurements indicative of one or more parameters associated with the first cable 144 and the second cable 146, which can include, in part, the tension, length, position, tensile force, and strain, as well as changes associated with any one or more of the foregoing parameters, associated with or experienced by each of the first cable 144 and the second cable 146 during and throughout the use and operation thereof according to the embodiments, as disclosed herein. In the exemplary embodiment illustrated in FIGS. 2-7, the first sensor 230*a* and the second sensor 230*b* can be positioned on the first tensioning device 140 and the second tensioning device 142 respectively, such that the first sensor 230*a* and the second sensor 230*b* sensingly engage the first cable 144 and the second cable 146 via the first tensioning device 140 and the second tensioning device 142 respectively, such as, e.g., via a transductive or other suitable sensing element in sensing contact or engagement with the respective first cable 144 and second cable 146 via the respective rod 204, 204' connected thereto. The first and second sensors 230*a*. 230*b*, can be embodied as and/or include a potentiometer, a laser based length detection sensor, an ultrasonic sensor, an ultrasonic based distance detection sensor, a load indicator, as well as combinations thereof. The one or more sensors 230 can also include at least one first pressure sensor 238*a* and at least one second pressure sensor 238*b* disposed on, within, proximate to, or otherwise positioned and configured to sensingly engage and detect or sense a pressure of the hydraulic fluid within one or more of the second fluid chamber 205 and the first fluid chamber 203 of the cylinder 206 of the first tensioning device 140 and the hydraulic fluid within one or more of the second fluid chamber 205' and the first fluid chamber 203' of the cylinder 206' of the second tensioning device 142, respectively. Referring to FIGS. 2-7, the implement system 120, and the cable monitoring system 121 thereof, further includes a controller 232. The controller 232 can be embodied as a machine control unit, a master electronic control unit, or a master controller of the machine 100 and can include one or more electronic control units as well as one or more electronic control modules which can include, in part, one or more processors, memory, one or more secondary storage devices, power supply circuitry, signal-conditioning circuitry, solenoid driver circuitry, and other appropriate circuitry, programming and/or control logic. The controller 232 is illustrated and discussed herein as a single controller or a control unit as shown in FIGS. 2-7 (and as further illustrated in FIG. 8) for the purposes of providing a clear, illustrative, exemplary disclosure without introducing undue complexity: notwithstanding, and as such, it should be understood that the controller 232 can be embodied as and include multiple controllers and/or control modules, such as, for instance, one or more master controllers/control modules and one or more local controllers/control modules, connected in electronic communication and configured to exchange, receive, transmit, monitor, generate, and/or process a plurality of sensed signals, information, and/or commands to monitor, regulate, and/or effectuate control and operation of the machine 100 as well as the implement system 120 and the cable monitoring system 121 thereof, as provided above and further discussed herein.

The controller 232 is electronically connected (via wireless, or alternatively, wired, electronic connections, shown via dashed lines in FIGS. 2-8) to the components of the machine 100, as well as components of the implement system 120 and the cable monitoring system 121 thereof according to any one or more of the embodiments disclosed herein and is configured, in part, to monitor, receive, and process one or more signals, inputs, commands, and any other data according to the embodiments as discussed herein to monitor, analyze, predict, and determine a condition or state of operability as well as a remaining useful life of each of the first and second cables 144, 146 according to any of the embodiments disclosed herein.

In particular, as illustrated in FIGS. 2-7, the controller 232 includes a memory 234, and can further include a communication device 236. In an alternative embodiment wherein the communication device 236 may be external to the controller 232, the controller 232 can be connected in electronic communication with the communication device 236. The controller 232 is additionally connected in electronic communication with to the one or more sensors 230, including the first sensor 230*a*, and the second sensor 230*b*, the first pressure sensor 238*a* and the second pressure sensor 238*b* (which can be via the communication device 236), to monitor and/or receive the one or more signals, readings, and/or measurements detected by each of the foregoing sensors. The controller 232 can further be connected, in part, in electronic communication with the operational control system 126 as well as the control devices 127 and display unit 106 of the machine 100, and can be connected in electronic controllable communication with the first tensioning device 140, the second tensioning device 142, the first pump 222, the second pump 224, the pressure relief valves 220*a* and 220*b*. In particular, in addition to the cable monitoring system 121, the controller 232 can be connected in electronic communication to receive one or more signals from the operational control system 126 and the control devices 127 thereof (as well as the cable monitoring system 121, as further disclosed herein) indicative of and/or corresponding to a desired, input, stored, processed, programmed and/or required operation of the machine 100, and in response, can generate and electronically transmit one or more signals to actuate and control the appropriate components and/or systems of the machine 100, including, in part, those of the implement system 120, in a manner corresponding to and consistent with the desired, input, stored, processed, programmed and/or required operation of the machine 100, according to any of the embodiments, as disclosed herein. The controller 232 can be configured to reference and execute one or more algorithms and/or instructions, which can define or control the operation of the controller 232, including but not limited to the reception, referencing, monitoring, and/or processing of data, signals, and inputs by the controller 232 to monitor, control, and effectuate the operation of the machine 100 as well as the components and systems thereof, as disclosed herein. As discussed, in part, above, the controller 232 can include any one or more of a processor, a microprocessor, a microcontroller, or any other suitable means for executing any of the one or more algorithms, as well as any included or additional instructions and/or associated computations.

The one or more algorithms, any included or additional instructions, as well as stored and/or input data which can be used by the controller 232 can be retrievably stored within the memory 234. The memory 234 can be provided on-board or resident within the controller 232 as shown, in part, in the exemplary embodiment of FIGS. 2-7, or, alternatively, all, or a part of the memory 234 can be external to, but electronically connected to and accessibly by, the controller 232. The memory 234 can include non-transitory computer-readable medium or memory, such as a disc drive, flash drive, optical memory, read-only memory (ROM), or the like.

In one or more embodiments, the controller 232 can include suitable logic, circuitry, and/or interfaces that are operable to execute one or more instructions stored in the memory 234 to perform predetermined operation. The controller 232 can be implemented using any of one or more suitable processor technologies. Non-limiting examples of the controller 232 include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor or any other processor. The operation of the controller 232 will be described in more detail below.

As discussed above, the controller 232 can include a communication device 236 which can be connected in electronic communication with the controller 232 as well as the components and systems of the machine 100. The communication device 236 can be any suitable device operable to receive and transmit signals, readings, commands, data and/or information electronically sensed, generated, and/or stored and communicated to the communication device 236 by and between two or more modules, devices, and/or components electronically and communicatively connected to the communication device 236. As such, via the communication device 236, controller 232 can be electronically and communicatively connected to monitor, transmit and/or receive one or more signals, readings, commands, and data to and/or from the components and systems of the machine 100, including but not limited to those of the implement system 120 and the cable monitoring system 121 as discussed herein. The communication device 236 can also be provided on-board, resident within, and/or as a module of the controller 232 as shown, in part, in the exemplary embodiment of FIGS. 2 and 3. Alternatively, the communication device 236 can be provided external to and/or as a module or device separate from, but electronically and communicatively connected to, the controller 232. The communication device 236 can be a transceiver (i.e. a device comprising both a transmitter and a receiver that are combined and share common circuitry or a single housing. When no circuitry is common between transmit and receive functions, the device is a transmitter-receiver). The transceiver can utilize one or more suitable communication protocols to transmit and receive data from the components and one or more computing devices. Examples of such communication protocols can include, but are not limited to, Transport Control Protocol/Internet Protocol (TCP/IP), 3G, 4G, 2G. Bluetooth, Zigbee, I2C, and/or the like.

The operation of the implement system 120 as well as the cable monitoring system 121, will be explained in conjunction with FIG. 3-FIG. 5. FIG. 3 illustrates what is defined as an initial position of the drilling device 138 is as shown in FIG. 3 as an illustrative, non-limiting, exemplary initial context of operation solely for the purposes of providing a discussion of the present disclosure. In order to initiate and execute the drilling operation, the machine 100 and implement system 120 can be engaged to operate in a working mode/drilling mode (which can be effectuated, in part, by the controller 232) which includes the drilling device 138 being lowered towards and engaging the work surface 104. The machine 100 can be actuated and engaged to operate in and according to the working mode/drilling mode according to any of the embodiments, as disclosed herein. In one embodiment, an operator present in the operator station 116 can actuate the corresponding and/or designated one or more of the one or more control devices 127 of the operational control system 126 configured to initiate and engage the machine 100 and implement system 120 to operate in the working mode/drilling mode, which can responsively transmit one or more working mode/drilling mode command signals to the controller 232 connected in electronic communication therewith, which can be via the communication device 236. In an alternative embodiment wherein the machine 100 is a remotely operated, a semi-autonomous, or an autonomous machine 100, the one or more working mode/drilling mode command signals can be electronically transmitted to the controller 232, which can be via the communication device 236, from a remote operator's station, from a remote master controller, or can be generated via processing of control and/or processing algorithms stored in the memory 234 of the controller 232. The controller 232 can process the one or more working mode/drilling mode command signals, and responsively generate and electronically transmit one or more working mode/drilling mode actuation command signals to the components and systems of the machine 100, including but not limited to those of the implement system 120 such that the components and systems of the machine 100 are actuated and engaged to operate in the working mode/drilling mode. In particular, in addition to, and at any time during or contemporaneous with the engagement of the machine 100 to operate in the working mode/drilling mode, the controller 232 can receive a working mode/drilling mode lowering or drilling command signal (according to any of the embodiments as described above, including, in one example from the one or more control devices 127) to initiate the lowering of the drilling device 138 towards the work surface 104. In response to the receiving and processing of the working mode/drilling mode lowering or drilling command signal, the controller 232 can generate and electronically transmit an drilling or lowering actuation command signal to the second pump 224 (and, additionally, a corresponding actuation command signal to the power source 110 which can not only be connected in electronic controllable communication with the controller 232 but also can be drivingly connected to the second pump 224 via. e.g., a shaft, a belt, or any other suitable mechanical connection) such that the second pump 224 is actuated to supply pressurized fluid from the tank 210 to the upper chamber 170 of the hydraulic feed cylinder 160, which fluidly engages the common piston 168 such that the cylinder body 162 of the hydraulic feed cylinder 160 is fluidly actuated to advance upward or otherwise toward the upper mounting structure 133 and/or the top end 132 of the mast 118 in linear translational movement along the first piston rod 164 and resultantly urge or extend at least a portion of the second piston rod 166 out of the cylinder body 162 relative to the first piston rod 164, as illustrated in FIG. 4. As discussed above, on account of the fixed attachment of the first and second sheaves 178, 180 to the cylinder body 162 of the hydraulic feed cylinder 160 at or adjacent to the top and bottom feed cylinder ends 174, 176 thereof, respectively, the upward movement or advancement of the cylinder body 162 of the hydraulic feed cylinder 160 results in a cooperative, corresponding, and common linear movement or advancement of the first and second sheaves 178, 180 in unison with the cylinder body 162. As such, such upward movement or advancement results the linear movement or advancement of the first sheave 178 or pulley toward the upper mounting structure 133 and the second sheave 180 or pulley upward toward the upper mounting structure 133 and away from the lower mounting structure 135. Furthermore, due to the pivotal and/or rotational coupling or engagement between the first and second sheaves 178, 180 and the opposing first and second cables 144, 146, respectively, as well as the opposing connections of the first and second cables 144, 146 to, and between, the first and second tensioning devices 140, 142, the first and second pulleys 190, 200, respectively, as well as the drilling device 138 and the mutually opposing forces associated therewith as discussed herein, the linear movement or advancement of the first sheave 178 or pulley toward the upper mounting structure 133 and the second sheave 180 or pulley toward the upper mounting structure 133 and away from the lower mounting structure 135 actuates a lowering or advancement of the drilling device 138 toward the lower mounting structure 135 such that the drill head 152 is advanced toward the work surface 104.

In a similar manner, while the machine 100 is engaged to operate in the working mode/drilling mode, the controller 232 can generate or receive a working mode/drilling mode retraction or pullback command signal (according to any of the embodiments discussed above, e.g., in response to and from the corresponding one or more control devices 127) when a pullback or retraction force is necessary or desired to advance the drilling device 138 toward the upper mounting structure 133 as well as a corresponding advancement and/or retraction of the drill head 152 upward and partially or completely out of or away from the work surface 104 and/or otherwise toward the upper mounting structure 133. In response to the receiving and processing of the working mode/drilling mode retraction or pullback command signal, the controller 232 can generate and electronically transmit a retraction or pullback actuation command signal to the second pump 224 (and, additionally, a corresponding actuation command signal to the power source 110, consistent with the foregoing discussion) such that the second pump 224 is actuated to supply pressurized fluid from the tank 210 to the lower chamber 172 of the cylinder body 162 to fluidly engage the common piston 168 such that the cylinder body 162 of the hydraulic feed cylinder 160 is fluidly actuated to advance downward or otherwise toward the lower mounting structure 135 and/or the bottom end 134 of the mast 118 in linear translational movement along the second piston rod 166 and resultantly urge or extend at least a portion of the first piston rod 164 out of the cylinder body 162 relative to the second piston rod 166, as illustrated in FIG. 5. As a result, and in a similar and equivalent, but opposite manner with respect to the foregoing discussion, the cooperative, corresponding, and common linear movement or advancement of the cylinder body 162 of the hydraulic feed cylinder 160 as well as the second sheave 180 or pulley toward the lower mounting structure 135 and the first sheave 178 or pulley toward the lower mounting structure 135 and away from the upper mounting structure 133 actuates a raising or upward advancement of the drilling device 138 toward the upper mounting structure 133 such that the drill head 152 is advanced or retracted upward and partially out of, completely out of, or otherwise away from the work surface 104, as illustrated in FIG. 5.

As discussed above, during the operation of the implement system 120, including, in part, during the working mode/drilling mode thereof, the first cable 144 and the second cable 146 are continuously subjected to tension and are maintained in the taut and firmly tensioned condition via the first tensioning device 140 and the second tensioning device 142, respectively, such that the first and second cables 144, 146 maintain a firm, secure, and mutually opposing, tensioned attachment to the drill head 152 therebetween to thus maintain a firm and secure, tensioned positioning and linear movement of the drill head 152 between the upper and lower mounting structures 133, 135 and/or the top and bottom ends 132, 134 of the mast 118, respectively, along, and aligned with the longitudinal axis 136 thereof and prevent any lateral, rotational, and/or angular movement of the drilling device 138 and the elements thereof. However, the forces associated with the operation of the implement system 120, including, in part, those associated with the positioning, movement, and operation of the drilling device 138 may result in the first cable 144 and/or the second cable 146 experiencing wear over a period of time. Such forces to which the first and second cables 144, 146 are exposed, and the wear that can result therefrom, may cause one or more of the first and second cables 144, 146 to stretch beyond a predetermined limit, and sustained exposure to such forces may lead to failure (e.g., breakage or snapping) of one or more of the first and second cables 144, 146 if not serviced or repaired. Failure, or extensive wear or stretching such as to the point of inoperability, of one or more of the first and second cables 144, 146 may lead to loss of productivity due to machine downtime and, in some instances, may cause damage to other components of the machine 100, including, in part, the implement system 120.

The implement system 120, and the cable monitoring system 121 thereof, by monitoring, in part, the first and second cables 144, 146, according to any of the embodiments of the present disclosure, is configured and operable to detect and prevent such instances of extensive wear and/or failure from occurring, as discussed above and further disclosed herein. In particular, the controller 232 can process the one or more monitored or received signals indicative of the condition, operation, and physical and positional conditions, characteristics, and/or states of each of the first and second cables 144, 146, as well as forces experienced by each of the first and second cables 144, 146 (in addition to, in one or more embodiments, the first and second tensioning devices 140, 142 as an indication thereof) during the operation, and can responsively determine, in part, whether one or more of the first and second cables 144, 146 is in an acceptable operating condition, or whether one or more of the first and second cables 144, 146 is in an unacceptable operating condition, e.g., is in a condition near or unacceptably close to failure, or extensive wear or stretching such as to the point of inoperability, according to any of the embodiments, as disclosed herein. In one or more embodiments as further discussed below, the controller 232 can be configured to monitor (and may further store, in the memory 234 thereof) the first cable length 'L1' of the first cable 144 and second cable length 'L2' of the second cable 146, as well as incremental changes in the first cable length 'L1' of the first cable 144 and second cable length 'L2' of the second cable 146, during the operation of the implement system 120, including, in part, during the working mode/drilling mode thereof. The controller 232 then compares each incremental change in the first cable length 'L1' of the first cable 144 and second cable length 'L2' of the second cable 146 a threshold value. If the incremental change in the first cable length 'L1' of the first cable 144 and/or that of the second cable length 'L2' of the second cable 146 exceeds the threshold value (which can be representative of at and/or approaching an unacceptable operating condition), the controller 232 responsively takes one or more actions configured to guard against and/or prevent any further use of one or more of the first and second cables 144, 146 which may lead to failure and/or may lead to loss of productivity due to machine downtime, including but not limited to generating a warning signal and/or actuating the components of the implement system 120 to operate in a "safe mode", as further disclosed herein.

The following will provide an additional, further disclosure of the functionalities, capabilities, implementation, and operability of implement system 120 and the cable monitoring system 121, and the included and/or associated components thereof, including, in part, the sensors 230 and the controller 232, to monitor, process, and determine, in part, the performance, operating condition, and/or remaining useful life of the first and second cables 144, 146, as well as the additional responsive actions to facilitate the provision of notification of such as well as further included and/or additional actions to guard against and/or prevent any damage, failure, and/or any other condition which may compromise the acceptable use, operation, and condition of the first and second cables 144, 146, as well as the machine 100 and systems thereof, including, in part, the implement system 120 according to the various embodiments, as disclosed herein. Disclosure of the various embodiments, as disclosed herein, are provided as applied to and with reference to the first cable 144 as shown in FIGS. 2-7, including, in part, with reference to the first cable 144 as shown in the exemplary position illustrated in FIG. 6 as well as the subsequent exemplary position shown in FIG. 7, as further discussed herein for the purposes of providing a clear, illustrative, exemplary disclosure without introducing undue prolixity. However, it should be understood that the following disclosure of the operability of the cable monitoring system 121 with reference to the first cable 144 is meant to apply in a corresponding, and equivalent manner to the monitoring of the second cable 146. Furthermore, the disclosure of the operability of the cable monitoring system 121 can further apply in a corresponding, and equivalent manner to positions of the implement system 120 which differ from those shown in FIGS. 6 and 7.

Figure 6:
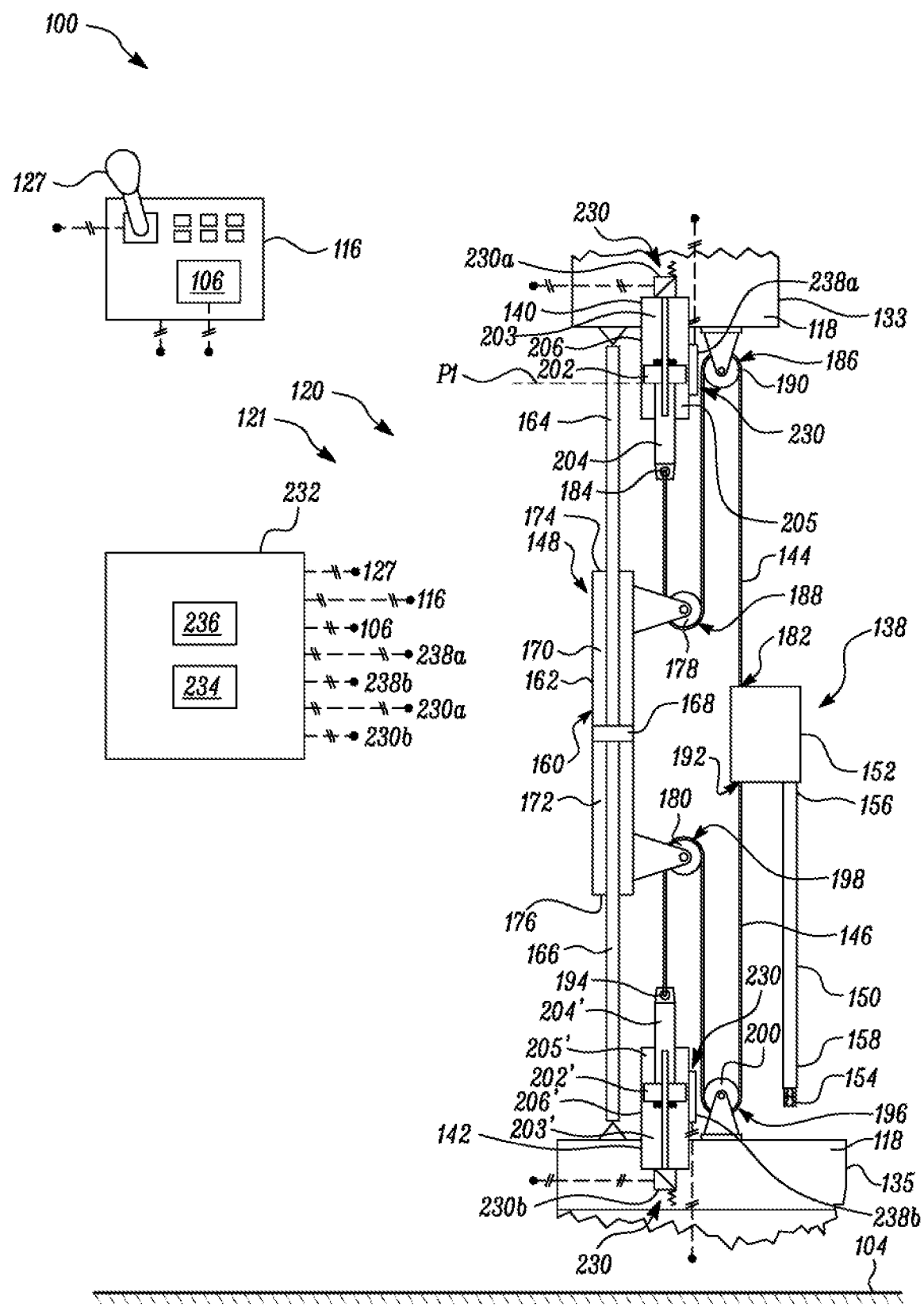
FIG. 6 illustrates the implement system having a first cable of first length, in accordance with an embodiment of the present disclosure.

FIG. 6 illustrates the first cable 144 operably installed for use in the implement system 120 (as disclosed above and further disclosed herein) in the taut, tensioned condition. Furthermore, FIG. 6 illustrates the first cable 144 in a condition which is defined as a new or newly installed condition or otherwise in a condition corresponding to or defined as that under which neither of the first cable 144 or the second cable 146 have experienced stress, loads, or other conditions which result in stretching and/or wear. As such, in the example shown in FIG. 6, the first cable 144 further includes and extends along a first cable length 'L1' which is defined as and corresponds to the length of the first cable 144 (extending from the first end 182 to the second end 184 thereof) in a newly installed or otherwise un-worn, un-damaged, and un-stretched condition. In addition, FIG. 6 illustrates the newly installed or otherwise un-worn, un-damaged, and un-stretched first cable 144 and corresponding first cable length 'L1' thereof operably installed for use in the implement system 120 and maintained under tension via (in part) the piston 202 of the first tensioning device 140 with the piston 202 at position 'P1', which may be defined as a non-limiting, exemplary first or initial position.

While the machine 100 and the implement system 120 are positioned and actuated to operate in any one or more of various positions and/or modes of operation, the first cable 144 (as well as the second cable 146) can be subjected to and experience a variety of forces, loads, stresses, or other conditions which may result in the first cable 144 (as well as the second cable 146) experiencing any one or more of stretching and/or wear. In addition to further uses, conditions, and/or modes of operation, as well as additional forces associated therewith, while positioned and engaged to operate in the working/drilling mode of operation as shown in FIG. 6 (and FIG. 7), the first cable 144 experiences and is subjected to the forces associated with and exerted thereon by the tension forces exerted on the first cable 144 via the first tensioning device 140, in addition to the mutual, opposing tension forces transferred to the first cable 144 by the second tensioning device 142 via the second cable 146. The first cable 144 can further experience and be subjected to forces exerted thereon via the first cable's 144 attachment to the drilling device 138 to support and maintain the position of the drilling device 138 (and the associated weight thereof), as well as forces associated with the actuation of the machine 100 in the working/drilling mode of operation, including in part, forces required to actuate the movement of the drilling device 138 and resulting from and generated by the engagement between the drill bit 154 and/or drill pipe 150 and the work surface 104. (It is to be noted that the second cable 146 experience forces which are substantially equivalent to those as described above with respect to the first cable 144). As a result of any one or more and/or any combination of the forces, including, in part, tensional forces, to which the first cable 144 can be subjected during use, including but not limited to those described above, the first cable 144 can experience an incremental change, and more particularly, an incremental increase 'ΔL1' in first cable length 'L1'. The amount or degree of the incremental increase 'ΔL1' in the first cable length 'L1' can depend on and/or can be defined as a result or function of one or more of the magnitude, type, and/or duration of the forces and tension to which the first cable 144 is subjected, as well as variables associated with the material composition of the first cable 144, including, in part, the Young's modulus, and modulus of elasticity associated therewith, etc. Upon the first cable 144 experiencing wear and/or fatigue as described above which results in at least some degree of stretching such that the length of the first cable 144 deviates to elongate or stretch and experience any degree of incremental increase 'ΔL1' beyond the first cable length 'L1', (or, in certain embodiments, any additional, subsequent incremental increases 'ΔL1$_2$', 'ΔL1$_3$' . . . 'ΔL1$_n$', as further discussed herein) the elongation or stretching can be detected by the cable monitoring system 121, including but not limited to the one or more sensors 230 thereof, according to any of the embodiments as discussed below.

In particular, the stretching of the first cable 144 beyond the first cable length 'L1' can result in a corresponding degree of lack of tautness or reduction in tension force experienced by and within the attachment between the second end 184 of the first cable 144 and the end of the rod 204 opposite the piston 202 of the first tensioning device 140, which can be sensed and/or detected by the first sensor 230*a* in sensing engagement therewith. e.g., via a transductive or other suitable sensing element of the first sensor 230*a* in sensing contact or engagement with the first cable 144 via the rod 204. Additionally, such stretching of the first cable 144 beyond the first cable length 'L1' can result in a corresponding reduction in pressure of the hydraulic fluid within the second fluid chamber 205 of the first tensioning device 140, which can be sensed and/or detected by the first pressure sensor 238*a*. One or more of the signal indicative of the reduction in tension force between the second end 184 of the first cable 144 and the end of the rod 204 and the reduction in pressure of the hydraulic fluid within the second fluid chamber 205 sensed and/or detected by the first sensor 230*a* and the first pressure sensor 238*a*, respectively, can be electronically monitored and received by the controller 232 connected in electronic communication with the first sensor 230*a* and the first pressure sensor 238*a* (e.g., via the communication device 236). The controller 232 can responsively process the signal sensed and/or detected by the first sensor 230*a*, or alternatively, the signal sensed and/or detected by the first pressure sensor 238*a*, or in yet another alternative, can process both signals from the first sensor 230*a* and the first pressure sensor 238*a*, and based upon such processing, can generate and electronically transmit one or more actuation command signals to actuate the components of the implement system 120 to engage (or re-engage) the first cable 144 in the taut or tensioned condition.

In one embodiment, the controller 232, utilizing internal programming, processing, and/or control logic, and the like, can apply, reference, or otherwise utilize and process the signal indicative of the degree of reduction in tension force as detected by the first sensor 230*a*, and additionally, or alternatively, the signal indicative of the degree of the reduction in pressure as detected by the first pressure sensor 238*a* as inputs into an algorithm stored in the memory 234 of the controller 232 to determine and/or calculate a corresponding, appropriate tensioning force, e.g., a pullback or retraction force, to be applied to the first cable 144 via the first tensioning device 140 to account for and retract the first cable 144 a distance equivalent to the incremental increase '$\Delta L1$' (or following an initial or first incremental increase '$\Delta L1_1$', any additional subsequent incremental increase, '$\Delta L1_2$', '$\Delta L1_3$', '$\Delta L1_4$' . . . '$\Delta L1_n$' as further discussed herein) in first cable length 'L1' such that the first cable 144 is returned to the taut or tensioned condition. Alternatively, one or more, or both of the foregoing signals from the first sensor 230*a* and the first pressure sensor 238*a* can be compared to, correlated with, referenced to, or otherwise analyzed by the controller 232 based upon corresponding values in a data set, a lookup table, or model saved within the memory 234 of the controller 232 which can include plurality of tensioning forces, e.g., pullback or retraction forces, (or values which quantify and/or characterize the same), and the controller 232 can determine the appropriate pullback or retraction force which corresponds with and is established based on the foregoing sensor signal values.

As provided above, the controller 232 can be connected in electronic and controllable communication with the components of the machine 100 as well as the implement system 120 thereof, including but not limited to the power source 110, the first and second pumps 222, 224, as well as the valves, including, in part, the one or more valves 226, 220*a*, 220*b*, and 217, as discussed herein. Upon the controller's 232 determination of the calculated tensioning force to be applied to the first cable 144 via the first tensioning device 140 to account for and retract the first cable 144 a distance equivalent to any incremental increase according to any of the embodiments as discussed above, the controller 232 can responsively generate and electronically transmit (e.g., via the communication device 236) one or more tensioning force actuation signals corresponding to the calculated tensioning force to the first pump 222 and/or the power source 110 as well as the valves, including at least the one or more valves 226, such that, in response to receiving the one or more tensioning force actuation signals, the first pump 222 is actuated to fluidly supply a corresponding amount of pressurized hydraulic fluid to the second fluid chamber 205 of the first tensioning device 140 to fluidly actuate the piston 202 (as well as the rod 204 attached thereto) to retract within the cylinder 206 (e.g., the actuation of the piston 202 from position P1 shown in FIG. 6 to position P2 shown in FIG. 7) upward at a distance equivalent to the incremental increase '$\Delta L1$' in the first cable length 'L1' (or following an initial or first incremental increase '$\Delta L1_1$', any additional subsequent incremental increase, '$\Delta L1_2$', '$\Delta L1_3$', '$\Delta L1_4$' . . . '$\Delta L1_n$' as further discussed herein) and pressurize the second fluid chamber 205 such that the retraction of the rod 204 pulls the first cable 144 toward the upper mounting structure 133 of the mast 118 and imparts the adequate or required tension in the first cable 144 such that the first cable 144 is maintained in the taut, firm, and tensioned condition to securely and controllably interact with, engage, position, and actuate the components of the implement system 120 including but not limited to the drilling device 138.

Although the foregoing provides a disclosure of an embodiment wherein the cable monitoring system 121 electronically and controllably actuates the first and second tensioning devices 140, 142 to retract a distance equivalent to any incremental increase (e.g., '$\Delta L1$'/'$\Delta L2$', or in an alternative embodiment, (or any additional subsequent incremental increase, '$\Delta L1_2$', '$\Delta L1_3$', '$\Delta L1_4$' . . . '$\Delta L1_n$'/ '$\Delta L2_2$', '$\Delta L2_3$', '$\Delta L2_4$' . . . '$\Delta L2_n$' following an initial or first incremental increase '$\Delta L1_1$'/'$\Delta L2_1$', as further discussed herein) in the first cable length 'L1' and/or the second cable length 'L2' to re-engage and maintain the first and second cables 144, 146 in a in the taut, firm, and tensioned condition (in that the above disclosure with respect to the first cable 144 and first tensioning device 140 applies in a corresponding, equivalent manner to the actuation of the second tensioning device 142 and second cable 146), the first and second tensioning devices 140, 142 can be actuated in other ways. To provide one example of an additional, alternative embodiment, the first and second tensioning devices 140, 142 can be hydraulically and/or hydromechanically controlled and actuated to automatically retract to maintain the first and second cables 144, 146 in the taut, firm, and tensioned condition in response to and as a result of changes and/or differences in pressure within the hydraulic system 208. In particular, as shown, in FIGS. 3-5, the hydraulic fluid within the conduits, including, in part, the second and third conduits 213*a*, 213*b*, connected in fluid communication with the second fluid chambers 205, 205' of the first and second tensioning devices 140, 142, respectively, can be maintained at a predefined, specific pressure (e.g., a predefined, specific pilot pressure) which corresponds to that required within the second fluid chambers 205, 205' to engage the pistons 202, 202' (and thereby the rods 204, 204' and second ends 184, 194 of the first and second cables 144, 146 connected thereto, respectively) and thus impart and maintain the adequate or required tension such that the first and second cables 144, 146 are maintained in the taut, firm, and tensioned condition. The first pump 222 as well as additional, associated components of the hydraulic system 208, including in part, the one or more valves 226 (as well as any of the additional valves, as disclosed herein), can be controllably and/or selectively actuated (e.g., via the controller 232) to fluidly supply and maintain the hydraulic fluid to and within the second and third conduits 213*a*, 213*b* at the predefined, specific pressure. As discussed above, any stretching which causes an incremental increase (e.g., '$\Delta L1$'/'$\Delta L2$') (or a subsequent incremental increase, as discussed below) in the first cable length 'L1' and/or the second cable length 'L2' can result in a corresponding reduction in pressure of the hydraulic fluid within the respective, corresponding second fluid chambers 205, 205' of the first and second tensioning devices 140, 142 below the required, predefined, specific pressure maintained by the first pump 222 within the second and third conduits 213a, 213b. Thus, in the event of stretching and an increase in length of the first and/or second cable 144 and/or 146 and the resultant reduction in pressure of the hydraulic fluid within the respective, corresponding second fluid chambers 205, 205' below the pressure of the hydraulic fluid maintained at the required, predefined, specific pressure maintained within the second and third conduits 213a, 213b connected in fluid communication with the second fluid chambers 205, 205', respectively, as well as the resultant pressure differential therebetween, the hydraulic fluid maintained at the required, predefined, specific pressure within the second and third conduits 213a, 213b will be fluidly communicated into the respective second fluid chamber 205, 205' experiencing a reduction in pressure, and the first pump 222 can be actuated to restore and maintain the hydraulic fluid within the second fluid chambers 205, 205' and the respective second and third conduits 213a, 213b fluidly connected thereto at the required, predefined, specific pressure. As a result, and in a manner consistent with the foregoing disclosure, the supply and restoration of pressurized hydraulic fluid at the required, predefined, specific pressure to the second fluid chambers 205, 205' will thus engage the pistons 202, 202' (as well as the rods 204, 204' and the first and second cables 144, 146 connected thereto, respectively) to retract a distance equivalent to any incremental increase (e.g., 'ΔL1'/'ΔL2') (or any additional subsequent incremental increases, as noted above and further discussed herein) in the first cable length 'L1' and/or the second cable length 'L2' to re-engage and maintain the first and second cables 144, 146 in a in the taut, firm, and tensioned condition.

In one embodiment, as discussed above and further disclosed herein, when the first cable 144 is in the newly installed and/or otherwise un-worn, un-damaged, and un-stretched condition and includes the corresponding un-worn and un-stretched first cable length 'L1' and is operably installed for use in the implement system 120 and maintained in the taut, tensioned condition (e.g., with no slack) at a corresponding initial position 'P1' of, and by, the piston 202 of the first tensioning device 140, such as the exemplary position thereof shown in FIG. 6, the controller 232 can monitor and receive a signal indicative of the position 'P1' of the piston 202 of the first tensioning device 140 sensed and/or detected by, and electronically communicated to the controller 232 from, the first sensor 230a which is attached or connected, in part, in positional sensing engagement with the first cable as well as the piston 202 and the rod 204 of the first tensioning device 140. e.g., via a transductive or other suitable sensing element of the first sensor 230a, to sense and/or detect, in part, the position of the piston 202. In response, the controller 232 can store the signal indicative of the position 'P1' of the piston 202 as corresponding to the un-worn and un-stretched first cable length 'L1' of the first cable 144 in the memory 234 thereof for further reference and processing, as disclosed herein.

Figure 7:
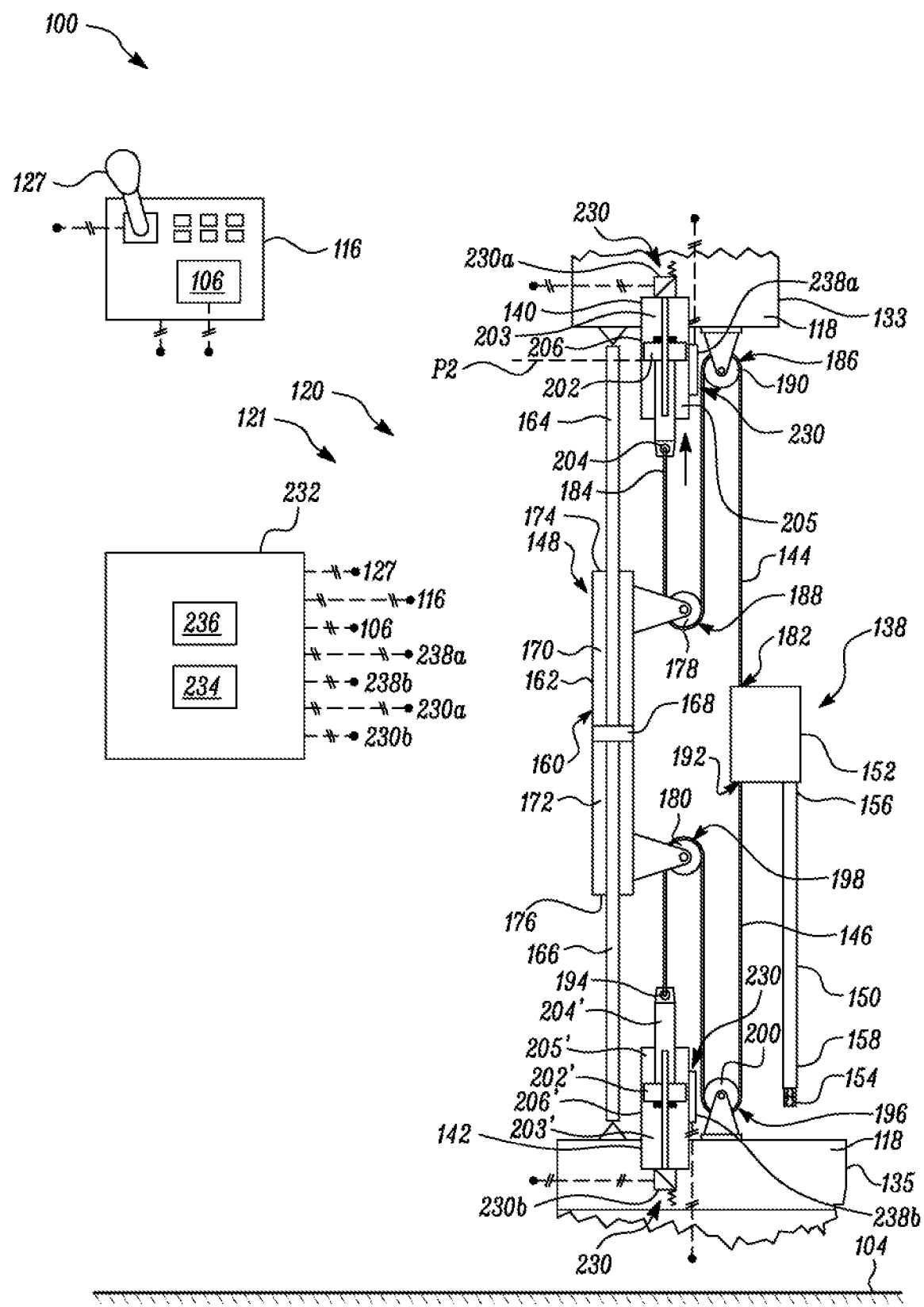
FIG. 7 illustrates the implement system wherein the first cable experiences an increment in the first length, in accordance with an embodiment of the present disclosure.

Upon the first cable 144 experiencing wear and/or fatigue as described above which results in at least some degree of stretching such that the length of the first cable 144 deviates to elongate or stretch and experience any degree of incremental increase 'ΔL1' beyond the first cable length 'L1', as discussed above, the first tensioning device 140, and the piston 202 thereof can be actuated to retract a distance equivalent to any incremental increase 'ΔL1' to position P2 as shown in FIG. 7 to re-engage and maintain the first cable 144 in the taut, firm, and tensioned condition, and the position P2 of the piston 202 can be sensed and/or detected by the first sensor 230a (via the transductive element thereof) and signals indicative of the same can be monitored and received by the controller 232 connected in electronic communication with the first sensor 230a. As such, the controller 232 can receive a signal indicative of the position 'P2' of the piston 202 of the first tensioning device 140 sensed and/or detected and electronically communicated to the controller 232 by the first sensor 230a. In response, the controller 232 can reference the signal indicative of the position 'P1' of the piston 202 corresponding to the un-worn and un-stretched first cable length 'L1' of the first cable 144 from the memory 234 of the controller 232 and compare the signal indicative of the position 'P1' with that of the position 'P2' of the piston 202 to calculate the incremental increase 'ΔL1' in first cable length 'L1', wherein 'P2'−'P1'='ΔL1'. Thereafter, the controller 232 can determine if the calculated incremental increase 'ΔL1' in first cable length 'L1' is indicative of or corresponds to an unacceptable operating condition of the first cable 144, as further discussed herein. It is to be noted that in the one or more additional embodiments discussed below, the disclosure of the above embodiment, as well as those disclosed below, each apply in a corresponding, equivalent manner, and, more particularly, can each be applied in a consistent manner for each of the first incremental increase '$\Delta L1_1$', as well as any subsequent additional subsequent incremental increases. '$\Delta L1_2$', '$\Delta L1_3$', '$\Delta L1_4$' ... '$\Delta L1_n$' as required for in connection with and/or as required for the controller's 232 determination of the operating condition of the first cable 144 based upon a total, combined incremental increase '$\Delta L1_{Total}$' in the first cable length 'L1' as further discussed herein.

In an additional embodiment, the controller 232 can calculate the incremental increase 'ΔL1' (as well as, in the embodiments discussed below, each additional subsequent incremental increases '$\Delta L1_n$' and the total, combined incremental increase '$\Delta L1_{Total}$') in the first cable length 'L1' of the first cable 144 by processing and/or analyzing signals indicative of the forces to which the first cable 144 is subjected during use and operation as sensed and/or detected by the first sensor 230a. In any embodiment, the first sensor 230a can not only sense the position of the piston 202 and the rod 204 as discussed above, but can additionally be in sensing contact or engagement with the first cable 144 via the rod 204, via the transductive or other suitable sensing element of the first sensor 230a, to continuously sense and/or detect signals indicative of forces, loads, and/or stresses, including, at least in part, tensional forces, to which the first cable 144 is subjected during use. In the present embodiment (as well as others as disclosed herein), the first sensor 230a can continuously sense and/or detect, generate, and electronically transmit signals indicative of such forces to the controller 232. The controller 232 can continuously monitor, receive, and process such signals to thereby continuously monitor and determine the operational state of the first cable 144, including, in part, a calculation of the incremental increase 'ΔL1' in the first cable length 'L1'. Specifically, in one embodiment, based upon the processing of the signals indicative of the forces, loads, and/or stresses imparted to the first cable 144 during use and received from the first sensor 230a, the controller 232 can determine and/or detect a tensional force T1 (or collective tensional force) which has been applied to the first cable 144 and/or under which the first cable 144 is experiencing during operation. In response, the controller 232 can calculate the incremental increase 'ΔL1' (and, in the embodiments discussed below, each additional subsequent incremental increases '$\Delta L1_n$' and the total, combined incremental increase '$\Delta L1_{Total}$') in first cable length 'L1' of the first cable 144 using, based upon, and/or as a function or result of the tensional force T1 in combination with the Young's modulus and/or modulus of elasticity of the first cable 144 (wherein such values of the Young's modulus and/or modulus of elasticity for the first cable 144 can be stored in the memory 234 and referenced by the controller 232).

In addition, or in an alternative embodiment, as discussed above, in addition to the first sensor's 230a detection of the forces, loads, and/or stresses, including, at least in part, tensional forces, to which the first cable 144 is subjected during use which can result in stretching of the first cable 144, the first sensor 230a can additionally sense and/or detect the degree of lack of tautness or reduction in tension force experienced by and within the attachment between the second end 184 of the first cable 144 and the end of the rod 204 opposite the piston 202 of the first tensioning device 140 which corresponds to and can be caused as a result of the stretching of the first cable 144 beyond the first cable length 'L1'. The signal indicative of the reduction in tension force between the second end 184 of the first cable 144 and the end of the rod 204 sensed and/or detected by the first sensor 230a can be electronically monitored and received by the controller 232 connected in electronic communication with the first sensor 230a. The controller 232, utilizing internal programming, processing, and/or control logic, and the like, can apply and process the signal indicative of the degree of reduction in tension force as detected by the first sensor 230a into an algorithm stored in the memory 234 of the controller 232 to calculate the incremental increase '$\Delta L1$' in the first cable length 'L1' (as well as each additional subsequent incremental increases '$\Delta L1_n$' and the total, combined incremental increase '$\Delta L1_{Total}$', as further disclosed herein). Alternatively, the signal from the first sensor 230a can be compared to, correlated with, referenced to, or otherwise analyzed by the controller 232 based upon corresponding values in a data set, a lookup table, or model saved within the memory 234 of the controller 232 which can include one of a plurality of values of incremental increases '$\Delta L1$' in the first cable length 'L1' which corresponds with and is established based on the signal from the first sensor 230a, and the controller 232 establishes, determines, and outputs the appropriate corresponding incremental increase '$\Delta L1$' in the first cable length 'L1' of the first cable 144.

In yet another embodiment, as discussed herein, the stretching of the first cable 144 beyond the first cable length 'L1' can result in a corresponding reduction in pressure of the hydraulic fluid within the second fluid chamber 205 of the first tensioning device 140, which can be sensed and/or detected by the first pressure sensor 238a. The signal indicative of the reduction in pressure of the hydraulic fluid within the second fluid chamber 205 sensed and/or detected by the first pressure sensor 238a can be electronically monitored and received by the controller 232. The controller 232 can apply and process the signal indicative of the degree of reduction in pressure of the hydraulic fluid as detected by the first pressure sensor 238a into an algorithm stored in the memory 234 of the controller 232 to calculate the incremental increase '$\Delta L1$' (as well as each additional subsequent incremental increases '$\Delta L1_n$' as further disclosed herein) in first cable length 'L1', or alternatively, the signal from the first pressure sensor 238a can be compared to, correlated with, referenced to, or otherwise analyzed by the controller 232 based upon corresponding values in a data set, a lookup table, or model saved within the memory 234 of the controller 232 which can include a plurality of values of incremental increases '$\Delta L1$' in first cable length 'L1', and the controller 232 can determine the appropriate corresponding incremental increase '$\Delta L1$' (as well as each additional subsequent incremental increases '$\Delta L1_n$' as further disclosed herein) in the first cable length 'L1' of the first cable 144 which corresponds with and is established based on the signal from the first pressure sensor 238a.

Upon determining the incremental increase '$\Delta L1$' (as well as each additional subsequent incremental increases '$\Delta L1_n$' as further disclosed herein) in the first cable length 'L1' of the first cable 144 according to any of the embodiments discussed above or those further discussed herein, the controller 232 can not only save the determined and/or calculated incremental increase '$\Delta L1$', but can also further process and determine if the incremental increase '$\Delta L1$' (or a total, combined incremental increase '$\Delta L1_{Total}$' as further discussed herein) in the first cable length 'L1' is indicative of or corresponds to an acceptable or unacceptable operating condition of the first cable 144. An unacceptable condition of the first cable 144 can be one in which the first cable 144 is in a condition near or unacceptably close to failure, and/or has experienced extensive wear or stretching such as near or unacceptably close to the point of inoperability. In one embodiment, the unacceptable condition can be established and/or defined based upon a threshold value, which may be a manufacturer recommended value for the first cable 144 and/or established based upon the material composition of the first cable 144 (as discussed above) as well as associated strength, stretching, stress, and/or force tolerances associated therewith, and can be stored in the memory 234 and referenced by the controller 232 as discussed herein. As one example, the threshold value can be an absolute, relative, or comparative value or standard which is equivalent to and defines the magnitude or measured length of stretching and/or elongation (and in one example, the limit thereof) the first cable 144 can endure, withstand, or otherwise be subjected to while still retaining the ability to securely, reliably, effectively, or otherwise acceptably operate before reaching an extent of stretching and/or elongation wherein the first cable 144 near or unacceptably close to yielding, breaking, snapping, or otherwise to the point of inoperability.

As such, upon determining the incremental increase '$\Delta L1$' (or the total, combined incremental increase '$\Delta L1_{Total}$' as further discussed herein) in the first cable length 'L1' of the first cable 144 according to any of the embodiments discussed above or further discussed herein, the controller 232 processes and compares the determined and/or calculated incremental increase '$\Delta L1$' (or the total, combined incremental increase '$\Delta L1_{Total}$') with the threshold value. If, based upon the comparison, the determined and/or calculated incremental increase '$\Delta L1$' (or the total, combined incremental increase '$\Delta L1_{Total}$') is less than or otherwise does not meet the threshold value, the controller 232 designates or otherwise defines the operational status of the first cable 144 as acceptable or satisfactory, and can continue to monitor the operational status of the first cable 144 as disclosed herein, (as well as the second cable 146 in a corresponding, equivalent manner), and, in response, can take any additional actions according to any of the embodiments as further disclosed herein.

If, however, based upon the comparison, the determined and/or calculated incremental increase '$\Delta L1$' (or the total, combined incremental increase '$\Delta L1_{Total}$') is equivalent to, or greater than, the threshold value, the controller 232 determines, and responsively designates or otherwise defines the operational status of the first cable 144 as unacceptable and can take any one or more of the responsive actions as discussed herein. In an additional embodiment, if the incremental increase '$\Delta L1$' (or the total, combined incremental increase '$\Delta L1_{Total}$' as further discussed herein) in the first cable length 'L1' of the first cable 144 is less than the threshold value but is approaching the threshold value at or within a proximate, critical range thereto, which, in one example, can be a calculated incremental increase '$\Delta L1$' (or a total, combined incremental increase '$\Delta L1_{Total}$') at or within a range of within one of twenty percent (20%), ten percent (10%) and five percent (5%) of reaching the threshold value, the controller 232 can designate or otherwise defines the operational status of the first cable 144 as a caution or warning status and can take any one or more of the corresponding responsive actions as discussed herein.

The threshold value can be established as a percentage value based upon and with reference to the original, newly installed, un-worn and un-stretched first cable length 'L1' of the first cable 144, and more particularly, such percentage value can be defined as limit of the permissible stretching beyond the un-stretched length based upon factors including, in part, the particular material composition of the first cable 144 (as discussed above). To provide one non-limiting example, the threshold value can be established at length of stretching equivalent to twenty percent (20%) of the length of the original, newly installed, un-worn and un-stretched first cable length 'L1' of the first cable 144 (as well as the second cable length 'L2' of the second cable 146). In other examples, the threshold value can be established at a percentage value as low as three percent (3%), or, alternatively, as high as thirty percent (30%) of the length of the original, newly installed, un-worn and un-stretched first cable length 'L1' of the first cable 144 (as well as the second cable length 'L2' of the second cable 146), and as such, in one example, the threshold value can be established at any one percentage value between three percent (3%) and thirty percent (30%) of the first cable length 'L1' of the first cable 144 (as well as the second cable length 'L2' of the second cable 146). In another example, the threshold value can be established at any one percentage value between three percent (3%) and five percent (5%), or, alternatively, between three percent (3%) and ten percent (10%) of the first cable length 'L1' of the first cable 144 (as well as the second cable length 'L2' of the second cable 146). In yet another example, the threshold value can be established at any one percentage value between ten percent (10%) and twenty five percent (25%) of the first cable length 'L1' of the first cable 144 (as well as the second cable length 'L2' of the second cable 146). It is to be understood, however, that other values for the threshold value are contemplated and within the scope of the present disclosure.

The value or measurement of the length of the original, newly installed, un-worn and un-stretched first cable length 'L1' of the first cable 144 can be calculated and/or determined by the cable monitoring system 121, including via the controller 232 and the one or more sensors 230 as discussed herein, or alternatively (or additionally), the value of the original, un-stretched first cable length 'L1' of the first cable 144 can be saved in the memory 234 and referenced by the controller 232. The controller 232 then calculates the ratio of the value of the calculated or determined incremental increase '$\Delta L1$' (or the total, combined incremental increase '$\Delta L1_{Total}$', as discussed herein) of the first cable 144 to the value of the original, un-stretched first cable length 'L1' of the first cable 144 as a percentage value to obtain an incremental increase percentage value (('$\Delta L1$'/'L1')=calculated incremental increase percentage value) (or (('$\Delta L1_{Total}$'/'L1')=calculated incremental increase percentage value). Finally, the controller 232 compares the calculated incremental increase percentage value with the threshold value, and if the calculated incremental increase percentage value is less than the threshold value (calculated incremental increase percentage value<threshold value), the controller 232 determines that the operating condition of the first cable 144 is acceptable or satisfactory and designates the operating condition as such. If however, the calculated incremental increase percentage value is equal to, or greater than or equal to, than the threshold value (calculated incremental increase percentage value> (or ≥) threshold value), the controller 232 determines and designates that the operating condition of the first cable 144 is unacceptable and can take any one or more of the responsive actions as discussed herein. In an additional embodiment, if the controller 232 determines that the calculated incremental increase percentage value is less than the threshold value but is approaching the threshold value to be within a critical range thereof, (e.g., the threshold value (if (calculated incremental increase percentage value<threshold value), then (calculated incremental increase percentage value+critical range percentage value≥threshold value)), the controller 232 can designate the operating condition as a caution or warning status.

In an additional embodiment, the first and second tensioning devices 140, 142 can have a size and range of operation which corresponds to the recommended life of the first and second cables 144, 146, wherein, in one example, the first and second tensioning devices 140, 142 can be sized to match the threshold value of the first and second cables 144, 146, respectively. In particular, each of the cylinders 206, 206' can have a height (or length) that is sized to limit the maximum distance of actuation or movement of each respective piston 202, 202' (as well as the corresponding rods 204, 204' attached thereto) to retract within the corresponding cylinders 206, 206' to pull the corresponding, respective first and second cables 144, 146 toward the corresponding, respective upper and lower mounting structures 133, 135 which is equivalent to the threshold value for each corresponding, respective first and second cables 144, 146. As such, the distance of movement or retraction of each respective pistons 202, 202' within the corresponding cylinders 206, 206' is prevented from retracting each corresponding, respective first and second cables 144, 146 to a length which exceeds the threshold value thereof. Based upon the processing of signals from the one or more sensors 230, controller 232 can determine if the threshold value of one or more of the first and second cables 144, 146 has been reached. In one example, the controller 232 can determine that the piston 202 has reached its maximum distance of actuation or movement of within the cylinder 206, which corresponds to the recommended life and/or threshold value limit of the first cable 144, in response to processing one or more signals from first sensor 230a indicating that the piston 202 has reached a position corresponding to the maximum distance of movement, or alternatively, one or more signals from the first pressure sensor 238a sensing a pressure within the second fluid chamber 205 indicative of a sensed spike in pressure supplied thereto (given the inability of the piston's 202 further movement), or in yet another alternative, one or more signals from the first pressure sensor 238a indicative of a supply of pressurized fluid to and/or increase in pressure within the second fluid chamber 205 in combination with a signal from the first sensor 230a indicative of a lack of movement and/or stationary position of the piston 202, It is to be noted that, as with the additional disclosure as provided above and further provided herein, the foregoing discussion applies in an equivalent and corresponding manner with respect to the second cable 146 and the piston 202' of the second tensioning device 142 as well as the associated second sensor 230b, second pressure sensor 238b, etc. In yet another example, the controller 232 can determine that one or more of pistons 202, 202' have reached its maximum distance of actuation or movement of within the respective cylinder 206, 206', and as a result has the recommended life and/or threshold value limit of the corresponding, respective first and/or second cable 144, 146 has been reached in response to receiving one or more signals from the opposing, respective second tensioning device 140 and first tensioning device 140. Specifically, when a downward (or upward) force is applied by the implement system 120 to actuate the drilling device 138 in a downward (or upward) direction as discussed herein, under normal operating conditions with the first cable 144 (and second cable 146) maintained in the tensioned, taut condition, the downward (or upward) actuation will result in an increase in pressure in the second fluid chamber 205' in the opposing second tensioning device 142 (or the second fluid chamber 205 in the opposing first tensioning device 140). However, if, based upon monitoring the signals from the second pressure sensor 238b (or first pressure sensor 238a), the controller 232 monitors and/or receives one or more signals therefrom indicative of a lack of a pressure rise in the opposing second fluid chamber 205' (or second fluid chamber 205) in response to such downward (or upward) movement or actuation of the drilling device 138, such a lack of pressure rise can be processed by the controller 232 to determine that the pistons 202 (or 202') has reached its maximum distance of actuation or movement and as a result the recommended life and/or threshold value limit of the first cable 144 (or the second cable 146) has been met. If so, according to any of the embodiments as discussed above, the controller 232 can responsively determine that the operating condition of one or more of the first and second cables 144, 146 is unacceptable and can take any one or more of the responsive actions as discussed herein.

As disclosed above, the controller's 232 determination of the operating condition of the first cable 144 can include, and can be based upon, a single, initial, incremental increase '$\Delta L1$' in the first cable length 'L1' according to any of the embodiments, as disclosed herein. However, in one or more additional embodiments, the controller's 232 determination of the operating condition of the first cable 144 in a manner consistent with any of the embodiments described herein, can also be based upon a total, combined incremental increase '$\Delta L1_{Total}$' in the first cable length 'L1', wherein the total, combined incremental increase '$\Delta L1_{Total}$' can be defined as and include the combined, sum total of a plurality of, or one or more, sequential and collective incremental increases '$\Delta L1$' in the first cable length 'L1' of the first cable 144 during and throughout the use thereof. The total, combined incremental increase '$\Delta L1_{Total}$' in the first cable length 'L1' can include a current, sensed incremental increase '$\Delta L1$' in the first cable length 'L1' as well as any previously detected one or more incremental increases '$\Delta L1$' in the first cable length 'L1', provided that the sum total of the previous incremental increases '$\Delta L1$' in the first cable length 'L1' have not exceeded or met the threshold value. In particular, the cable monitoring system 121, and the controller 232 thereof, can monitor and make a determination of the condition of the first cable 144 based upon the analysis and processing of the total, combined incremental increase '$\Delta L1_{Total}$' in the first cable length 'L1' consisting only of an initial, or first incremental increase '$\Delta L1_1$' in the first cable length 'L1' as determined by the controller 232 according to any embodiment, as disclosed herein (wherein the '$\Delta L1_{Total}$' in the first cable length 'L1'=$\Delta L1_1$). If, based upon a determination by the controller 232 according to any embodiment as discussed herein that the '$\Delta L1_{Total}$' consisting only of the first incremental increase '$\Delta L1$' does not exceed or meet the threshold value and results in the determination of an acceptable or satisfactory operating condition, the controller 232 can save the value of the first incremental increase '$\Delta L1_1$' and continue to monitor the condition of the first cable 144. Thereafter, if the first cable 144 experiences an additional, sequential, subsequent, second incremental increase '$\Delta L1_2$', again, as determined by the controller 232 based upon and in response to signals sensed by the sensors 230 according to any embodiment discussed above, the controller 232 can calculate (and update) the '$\Delta L1_{Total}$' by referencing the value of the first incremental increase '$\Delta L1_1$' previously determined by the controller 232 and saved in the associated memory 234, and combining the value of the first incremental increase '$\Delta L1_1$' with the subsequent, second incremental increase '$\Delta L1_2$' to thus calculate the value of the total increase in the first cable length 'L1' as the sum total of first and second incremental increases ('$\Delta L1_{Total}$'='$\Delta L1_1$'+'$\Delta L1_2$'). Thereafter, the controller 232 can determine the operating condition of the first cable 144 based upon the analysis and processing of the (updated) '$\Delta L1_{Total}$' (wherein '$\Delta L1_{Total}$'='$\Delta L1_1$'+'$\Delta L1_2$') according to any embodiment, as disclosed herein, and if the '$\Delta L1_{Total}$' consisting of the total combined value of the first and second incremental increases '$\Delta L1_1$', '$\Delta L1_2$' does not exceed or meet the threshold value and results in the determination of an acceptable or satisfactory operating condition, the controller 232 can save the value of the second incremental increase '$\Delta L1_2$' in the associated memory 234. Subsequently, and in a consistent manner, the controller 232 can continue to monitor and calculate (and update) the '$\Delta L1_{Total}$' for additional, sequential, subsequent incremental increases '$\Delta L1_3$', '$\Delta L1_4$' ... '$\Delta L1_n$' (wherein '$\Delta L1_{Total}$'=$\Sigma$('$\Delta L1_1$'+'$\Delta L1_2$'+'$\Delta L1_3$'+'$\Delta L1_4$'+ ... '$\Delta L1_n$'), until the calculated and updated '$\Delta L1_{Total}$' meets or exceeds the threshold value. Again, the foregoing discussion is equally applicable to the second cable 146, and, as such, in an equivalent and corresponding manner, the controller 232 can monitor and calculate (and update) the '$\Delta L2_{Total}$' for one or more sequential and collective incremental increases '$\Delta L2$' in the second cable length 'L2' of the second cable 146, e.g., '$\Delta L2_{Total}$'='$\Delta L2_1$'; '$\Delta L2_{Total}$'='$\Delta L2_1$'+'$\Delta L2_2$'; '$\Delta L2_{Total}$'=$\Sigma$('$\Delta L2_1$'+'$\Delta L2_2$'+'$\Delta L2_3$'+'$\Delta L2_4$'+ ... '$\Delta L2_n$'); until the calculated and updated '$\Delta L2_{Total}$' meets or exceeds the threshold value. Upon one or more of the calculated '$\Delta L1_{Total}$' and '$\Delta L2_{Total}$' meeting or exceeding the threshold value according to any of the embodiments as discussed above, the controller 232 can responsively determine that the operating condition of the corresponding first and/or second cable 144 and/or 146 is unacceptable and can take any one or more of the responsive actions as discussed herein.

The cable monitoring system 121, including, in part, the controller 232 thereof, can additionally determine a remaining useful life of the first cable 144 and the second cable 146 based upon the continuous monitoring and analysis, in real time, of one or more parameters, including prior operating condition(s) of the first cable 144 and the second cable 146, prior forces and/or loads under which the each of the first cable 144 and second cable 146 have been operated and exposed, the current operating condition of each of the first cable 144 and the second cable 146, forces and/or loads which each of the first cable 144 and the second cable 146 are currently experiencing and operating, the material composition of the first cable 144 and the second cable 146 as well as associated strength, stretching, stress, and/or force tolerances associated therewith, as well as various combinations such parameters. Such parameters can be sensed and/or detected by the one or more sensors 230, stored in the memory 234 of the controller 232, and/or calculated by the controller 232 in a manner consistent with any one or more of the embodiments discussed above and further disclosed herein. The controller 232 can, in part, continuously monitor and electronically receive one or more signals from the one or more sensors 230, as disclosed herein, indicative of one or more of such parameters associated with each of the first cable 144 as well as the second cable 146, and can process such signals, in addition to further information and/or data, as disclosed herein, to determine, save (in the memory 234), and update the remaining useful life of each of the first cable 144 and the second cable 146 continuously, in real time, during and throughout the operation and use of the first and second cables 144, 146, and take any further responsive actions discussed herein. Again, although the disclosures of the determinations of the remaining useful life as provided below are discussed with respect to the first cable 144, the cable monitoring system 121, including, in part, the controller 232 thereof, can additionally determine the remaining useful life of the second cable 146 in a manner which consistent with and equivalent to that as discussed below with respect to the first cable 144.

In one example, the controller 232 can continuously monitor and electronically receive one or more signals from the one or more sensors 230, e.g., signals from the first sensor 230a indicative of a position of the components of the first tensioning device 140 associated with the first cable 144, and/or forces, loads, and/or stresses, including, at least in part, tensional forces, to which the first cable 144 is subjected and/or signals from the first pressure sensor 238a, according to and consistent with any embodiment as discussed above. Based upon the processing of such signals, the controller 232 can determine the current length of the first cable 144, the incremental increase '$\Delta L1$' in the first cable length '$L1$', and/or the current incremental increase (e.g., '$\Delta L1_1$'+'$\Delta L1_2$'+'$\Delta L1_3$'+'$\Delta L1_4$'+ . . . '$\Delta L1_n$') in the first cable length '$L1$' of the first cable 144, and can further determine the total, combined incremental increase $\Delta L1_{Total}$ in the first cable length '$L1$' of the first cable 144 according to and consistent with any embodiment as discussed above, and can further process the corresponding values to determine the remaining useful life of the first cable 144, as discussed herein. In one embodiment, prior to determining the remaining useful life of the first cable 144 (or contemporaneous therewith) as discussed herein, the controller 232 can determine the operating condition of the first cable 144 to ensure that the current operating condition is unacceptable, and thus the remaining useful life of the first cable 144 has already been met or exceeded, by comparing the incremental increase '$\Delta L1$' or the total, combined incremental increase $\Delta L1_{Total}$ with the threshold value according to any of the corresponding embodiments as discussed herein to ensure that the incremental increase '$\Delta L1$' or the total incremental increase $\Delta L1_{Total}$ has not exceeded or met the threshold value. If the operating condition of the first cable 144 is acceptable or satisfactory as determined by the controller 232, the controller 232 can proceed to determine the remaining useful life of the first cable 144. Alternatively, in instances where the threshold value is met or exceeded, the controller 232 can determine and output a remaining useful life as corresponding to none or 0% which can accompany the controller's 232 determination and designation of the operating condition of the first cable 144 as unacceptable.

The remaining useful life of the first cable 144 can, in one embodiment, be defined, and calculated, e.g. via an algorithm stored in the associated memory 234, by the controller 232 as a ratio or relationship between the incremental increase '$\Delta L1$' or the total, combined incremental increase $\Delta L1_{Total}$ in the first cable length '$L1$' of the first cable 144 and the threshold value. Specifically, the controller 232 can further process the incremental increase '$\Delta L1$' or the total, combined incremental increase $\Delta L1_{Total}$ calculated thereby and can reference the threshold value for the first cable 144 from the memory 234 to calculate and determine the remaining useful life of the first cable 144 as a percentage based upon a ratio between the value of the incremental increase '$\Delta L1$' or the total, combined incremental increase $\Delta L1_{Total}$ and the threshold value, wherein in one example, the ratio can be linear, e.g., ((100%−('$\Delta L1$' value/threshold value)=remaining useful life percentage) or (100%−('$\Delta L1_{Total}$' value/threshold value)=remaining useful life percentage)) wherein incremental increase '$\Delta L1$' or total, combined incremental increase '$\Delta L1_{Total}$' values which amount to none, a quarter, half, three-quarters, or the at or equivalent to of the threshold value are calculated by the controller 232 as the first cable 144 having a remaining useful life percentage of 100%, 75%, 50%, 25%, and 0%, respectively. Alternatively, the relationship between the value of the incremental increase '$\Delta L1$' or the total, combined incremental increase '$\Delta L1_{Total}$' and the threshold value can be non-linear, e.g., incremental increase '$\Delta L1$' or total, combined incremental increase '$\Delta L1_{Total}$' values which amount to none or zero and those which are at or equivalent to of the threshold value remain and are determined by the controller 232 as the first cable 144 having a remaining useful life percentage of 100% and 0%, respectively, but the remaining useful life percentages of the first cable 144 are determined by the controller to decline at a more rapid rate for incremental increase '$\Delta L1$' or total, combined incremental increase '$\Delta L1_{Total}$' values which are 50% of the threshold value or greater than for those that are between 0% and 49% of the threshold value. In the latter example, the value of the incremental increase '$\Delta L1$' or the total, combined incremental increase '$\Delta L1_{Total}$' and the threshold value can be compared to, correlated with, referenced to, or otherwise analyzed by the controller 232 based upon corresponding values in a data set, a lookup table, or model saved within the memory 234 of the controller 232 which can include a plurality of remaining useful life percentage values, and the controller 232 can determine the appropriate corresponding remaining useful life percentage value of the first cable 144 which corresponds with and is established based on the '$\Delta L1$' or '$\Delta L1_{Total}$' values as well as the threshold value.

In another embodiment, the controller 232 can calculate the remaining useful life of the first cable 144 based not only on the ratio or relationship between the increase in the length of the first cable 144 and the threshold value, but also, and in combination with, the tension forces experienced by the first cable 144. In addition to the controller 232 receiving and processing the signals from the one or more sensors 230 to determine the incremental increase '$\Delta L1$' (or the total incremental increase '$\Delta L1_{Total}$') in the first cable length '$L1$' according to any of the embodiments discussed herein, the controller can additionally electronically monitor and receive at least one (or one or more) signal indicative of a tension force (or a corresponding value thereof) which the first cable 144 is currently being subjected to and/or operating under in real time while engaged in use in the implement system 120 as sensed and/or detected by the first sensor 230a. The controller 232 can responsively calculate the remaining useful life percentage of the first cable 144 as a ratio or relationship between the incremental increase '$\Delta L1$' or the total incremental increase '$\Delta L1_{Total}$' and the threshold value according to any of the examples discussed above. For the purposes of, and as specifically applied to the discussion of the present embodiment, the remaining useful life percentage of the first cable 144 as calculated by the controller 232 as a ratio or relationship between the incremental increase '$\Delta L1$' or the total incremental increase $\Delta L1_{Total}$ and the threshold value according to any of the examples discussed above will be referred to herein as the "initial or threshold ratio remaining useful life percentage value". The controller 232 can subsequently, or simultaneously, modify or further process the initial or threshold ratio remaining useful life percentage value of the first cable 144 based upon the value corresponding to the magnitude of tension force to which the first cable 144 is under, being subjected to, or otherwise applied to the first cable 144 as sensed by the first sensor 230a. In one embodiment, the initial or threshold ratio, remaining useful life percentage value can be compared to, correlated with, referenced with, or otherwise analyzed by the controller 232 based upon corresponding values in a data set, a lookup table, or model saved within the memory 234 of the controller 232 which can include a plurality of reference threshold ratio, remaining useful life percentage values, each including a corresponding, plurality of tension values (also defined herein as a range of tension values) and corresponding remaining useful life percentage values, and the controller 232 can determine the appropriate corresponding remaining useful life percentage value of the first cable 144 which corresponds with and is established based on the initial or threshold ratio remaining useful life percentage value as well as the sensed tension force value. In particular, in one embodiment, the controller 232 can determine and calculate the initial or threshold ratio remaining useful life percentage value in a manner corresponding to and consistent with any of the embodiments disclosed above. The controller 232 can process the calculated initial or threshold ratio remaining useful life percentage value based upon and referenced and/or correlated with a corresponding, equivalent one of the reference threshold ratio remaining useful life percentage values in a data set, a lookup table, or model saved within the memory 234 of the controller 232, and the sensed tension force value ($T_S$) being currently applied to the first cable 144 can be analyzed based upon and/or referenced or correlated with a corresponding, equivalent value within the range of tension values associated with and/or specific to the calculated initial or threshold ratio remaining useful life percentage value in a data set, a lookup table, or model saved within the memory 234 of the controller 232. The range of tension values can be stored in the memory 234 and referenced by the controller 232, as disclosed herein, and can include a nominal, expected, and/or normal tension value (T) which can correspond to and/or be established as equivalent to an amount of tension experienced by and/or applied to the first cable 144 under expected or normal conditions, or otherwise established as a tension value which, when correlated and/or processed by the controller 232, would not result in any modification to or adjustment of the initial or threshold ratio remaining useful life percentage value.

The range of tension values can also include a plurality of increased tension values which can range from just above the nominal, expected, and/or normal tension value ($T_S = T_N$) to a maximum tension value ($T_{MAX}$). As provided above, each initial or threshold ratio remaining useful life percentage value (upon and via the referencing and/or correlation with the equivalent reference threshold ratio remaining useful life percentage value) can include a specific, corresponding range of tension values which can be established based upon, and specific to, the percentage value of initial or threshold ratio remaining useful life percentage value. As such, the maximum tension value ($T_{MAX}$) can be defined and established as a tension value equivalent to that, when applied to the first cable 144 having, based upon, and currently operating at, the specific initial or threshold ratio remaining useful life percentage value as calculated by the controller 232, would result in and/or cause increase in the first cable length 'L1' of the first cable 144 such that the additional incremental increase '$\Delta L1$' or resultant, total, combined incremental increase '$\Delta L1_{Total}$' in the first cable length 'L' would meet the threshold value, and thus result in the controller's 232 determination and designation of the operating condition of the first cable 144 as unacceptable. Consequently, the maximum tension value ($T_{MAX}$) included and specific to a threshold ratio percentage value saved in the memory 234 as correlated to, and equivalent to a first cable 144 having an initial or threshold ratio remaining useful life percentage value of, e.g., ninety percent (90%) may be much larger than that of a first cable 144 having an initial or threshold ratio remaining useful life percentage value of, e.g., ten percent (10%). The range of tension values can also include a plurality of reduced tension values which can range from just below the nominal, expected, and/or normal tension value ($T_N$) to a minimum tension value ($T_{MIN}$), wherein, in one example, the minimum tension value ($T_{MIN}$) can correspond to and/or be established as equivalent to the lowest or minimal amount of tension that can be experienced by and/or applied to the first cable 144 while engaged in use in the implement system 120.

The determination by the controller 232 of the remaining useful life percentage of the first cable 144 based, in part, upon the initial or threshold ratio remaining useful life percentage value, the sensed tension value ($T_S$), and the range of tension values can be performed according to any of the embodiments as discussed above and further disclosed herein. In particular, in one embodiment, the controller 232 can process the initial or threshold ratio remaining useful life percentage value, the sensed tension value ($T_N$), the corresponding range of tension values (including, in part, the nominal, expected, and/or normal tension value ($T_N$)), as well as the corresponding tension value from the range of tension values, as disclosed above, as inputs into an algorithm stored in the memory 234 of the controller 232 to determine the remaining useful life percentage of the first cable 144 by modifying or adjusting the initial or threshold ratio remaining useful life percentage value by an amount which corresponds to the measure, proportion, or extent by which the sensed tension value ($T_S$) deviates from the nominal, expected, and/or normal tension value ($T_N$) within the range of tension values, as further disclosed herein. In another embodiment, each of the tension values included in the range of tension values for each of the reference threshold ratio remaining useful life percentage values stored in the memory 234 can include a corresponding remaining useful life percentage which can be referenced and output by the controller 232 upon correlating the initial or threshold ratio remaining useful life percentage value and the sensed tension value therewith, as disclosed herein.

As further discussed herein, larger sensed tension force values as sensed by the first sensor 230a and processed by the controller 232 can reduce the initial or threshold ratio remaining useful life percentage value and result the controller's 232 determination of a comparatively lower remaining useful life percentage of the first cable 144, and sensed smaller tension force values can increase the initial or threshold ratio remaining useful life percentage value and result the controller's 232 determination of a comparatively higher remaining useful life percentage of the first cable 144. The first cable 144 can be operating with and include an incremental increase '$\Delta L1$' in the first cable length 'L1' or a total, combined incremental increase $\Delta L1_{Total}$ in the first cable length 'L1', which, when processed by the controller 232 based upon the threshold value, results in the controller's 232 calculation of the initial or threshold ratio remaining useful life percentage value, again, according to any of the embodiments disclosed above, which, in one illustrative, non-limiting example, may be seventy percent (70%). The controller 232 can further process the initial or threshold ratio remaining useful life percentage value based upon the sensed tension force value (TS) being currently applied to the first cable 144 in current, real-time implementation and/or use within the implement system 120, as disclosed above. If the sensed tension force value ($T_S$) is equivalent to the nominal, expected, and/or normal tension value ($T_S=T_N$), the controller 232 determines and establishes the remaining useful life percentage of the first cable 144 as equivalent to the calculated initial or threshold ratio remaining useful life percentage value, which, again, in the current example, may be seventy percent (70%).

If the sensed tension force value ($T_S$) as detected and/or sensed by the first sensor 230a is equivalent to a value in the range of tension values which is just above, or just below the nominal, expected, and/or normal tension value ($T_S=T_N$), the controller 232 can apply and process the sensed tension value ($T_S$), as disclosed above, to modify or adjust the calculated initial or threshold ratio remaining useful life percentage value a corresponding amount, and as such, the controller 232 can decrease or increase, respectively, the calculated threshold ratio percentage (or the initial calculated remaining useful life percentage) to determine and establish a remaining useful life percentage of the first cable 144 which is decreased or increased, respectively, by a percentage amount which corresponds to the magnitude, measure, or extent of deviation from the nominal, expected, and/or normal tension value ($T_N$) of the first cable 144, which, in the present example, may be sixty nine percent (69%) or seventy one percent (71%), respectively.

If the sensed tension force value ($T_S$) as detected and/or sensed by the first sensor 230a is equivalent to, or near, the minimum tension value ($T_{MIN}$) in the range of tension values, the controller 232 can modify or adjust the initial or threshold ratio remaining useful life percentage value to account for the significantly low, e.g., minimum amount, of tension force experienced by the first cable 144 during use, and calculate and determine the remaining useful life percentage of the first cable 144 by modifying and/or adjusting, and in particular, increasing, the calculated initial or threshold ratio remaining useful life percentage value by a maximum amount. It is contemplated that, in certain embodiments, the minimum tension value ($T_{MIN}$) can be a singular value, and each minimum tension value ($T_{MIN}$) included in the ranges of tension values can be equivalent; however, given that the determination of the remaining useful life percentage of the first cable 144 by the controller 232 is based upon and defined by, at least in part, the initial or threshold ratio remaining useful life percentage value of the first cable 144 as determined by and representative of, in part, the extent of stretching experienced by the first cable 144 ('$\Delta L1$' or $\Delta L1_{Total}$), in response to a sensed tension force value ($T_S$) equivalent to the minimum tension value ($T_{MIN}$), the controller's 232 adjustment or modification to increase the initial or threshold ratio remaining useful life percentage value by the corresponding maximum increase may not result in the calculation of a remaining useful life percentage of the first cable 144 of one hundred percent (100%), particularly in instances wherein the current calculated initial or threshold ratio remaining useful life percentage value is quantified by, reflective of, and/or defined as a function of an extent of stretching experienced by the first cable 144 as one which is nearing the threshold value.

In one embodiment, the maximum increase in response to a sensed tension force value ($T_S$) equivalent to the minimum tension value ($T_{MIN}$) can be established based upon, e.g., the material composition and/or performance characteristics of the first cable 144, and, in one example, can be established at one of thirty percent (30%), forty percent (40%), fifty percent (50%), sixty percent (60%), and seventy percent (70%). To provide a non-limiting, illustrative example wherein the maximum increase value is established at forty percent (40%), in instances wherein based upon an extent of stretching experienced by the first cable 144 (e.g., at forty percent (40%) of the threshold value or lower) the controller 232 determines an initial or threshold ratio remaining useful life percentage value of sixty percent (60%) or higher, a corresponding, sensed minimum tension ($T_{MIN}$) value can result in an adjustment of the initial or threshold ratio remaining useful life percentage value to a remaining useful life percentage as determined by the controller 232 of zero percent (0%); however, in instances wherein the initial or threshold ratio remaining useful life percentage value is calculated at, e.g., fifty percent (50%), thirty percent (30%), or ten percent (10%), a sensed minimum tension ($T_{MIN}$) value can result in an adjustment of the initial or threshold ratio remaining useful life percentage value to a remaining useful life percentage as determined by the controller 232 of ninety percent (90%), seventy percent (70%), or fifty percent (50%), respectively.

Upon the controller's 232 determination of the remaining useful life percentage according to any of the embodiments as discussed herein, the controller 232 can provide notification, including, in part, to an operator of the machine 100 of the remaining useful life percentage of the first cable 144 (as well as the second cable 146 consistent with the foregoing disclosure) as further discussed herein. In addition, or alternatively, the controller 232 can further, define, calculate, and/or provide notification of the remaining useful life of the first cable 144 (as well as the second cable 146) as an amount or period of time remaining that the first cable 144 (as well as the second cable 146) can remain in acceptable, operable use in the implement system 120 before reaching the unacceptable operating condition. In one embodiment, the controller 232 can continuously monitor, and update, the remaining useful life percentage as determined according to any of the embodiments disclosed above, and can further apply and process (e.g., via a stored algorithm) the remaining useful life percentage based upon a predefined, established total time of operation value for the first cable 144 (as well as the second cable 146) stored in and referenced by the controller 232 from the associated memory 234 reference and process of the first cable 144 (as well as the second cable 146) calculate, and provide notification of the remaining useful life of the first cable 144 (as well as the second cable 146) as an amount or period (e.g., hours &/or minutes) of time remaining (remaining useful life percentage value of the first cable 144 or the second cable 146 (e.g., 50%)× corresponding total time of operation value (e.g., 20 hours or 1200 minutes)=remaining useful life operation time (10 hours or 600 minutes). Alternatively, the controller 232 can calculate, convert, and output/provide notification of the calculated remaining useful life percentage value as a remaining useful life operation time value corresponding and/or correlated to the calculated remaining useful life percentage value via a data set, a lookup table, or model saved within the memory 234 of the controller 232.

INDUSTRIAL APPLICABILITY

As discussed above, during the operation of the implement system 120, the first cable 144 and the second cable 146 are continuously subjected to tension from the first tensioning device 140 and the second tensioning device 142 so that they perform their function in an optimal manner. However, the first cable 144 and the second cable 146 can wear over a period of time and can stretch beyond a predetermined limit and can even break if not serviced or repaired (which can lead to loss of productivity due to machine downtime and in some cases can even cause damage to other components of the drilling apparatus). The implement system 120 as disclosed in the present application obviates such a scenario from taking place and eliminates/reduces machine downtime and damage to other components of the drilling apparatus. As discussed above and further discussed herein, the cable monitoring system 121, and the included and/or associated components thereof, including, in part, the sensors 230 and the controller 232, is configured to continuously monitor, process, and determine, in part, the performance, operating condition, and/or remaining useful life of the first and second cables 144, 146 in real time. The cable monitoring system 121 and the controller 232 thereof are further configured to provide notification, in real time, to an operator and/or machine management system, as disclosed herein, of the current operating condition and/or remaining useful life of the first and second cables 144, 146 as determined by the cable monitoring system 121. In providing such notification, the cable monitoring system 121, and controller 232 thereof, can provide the operator and/or machine management system with the opportunity to take any appropriate responsive actions, including but not limited to actions relating to the operation of the machine 100 and implement system 120 thereof, which may be necessary to prevent any damage to one or more of the first and second cables 144, 146 (as well as any associated components of the implement system 120 and/or machine 100). Such notification from the cable monitoring system 121 can further provide the operator and/or machine management system 1000 (and/or a distribution and supply system 1001, as discussed herein) with the opportunity to coordinate, plan, and schedule timely procurement and deployment of maintenance services and/or personnel to ensure replacement of one or more of the first and second cables 144, 146 as necessary to prevent any machine 100 downtime or loss in productivity. Furthermore, the cable monitoring system 121 and the controller 232, based upon the current operating condition and/or remaining useful life of the first and second cables 144, 146 as determined thereby, can responsively take any additional responsive actions as disclosed above and further disclosed herein, to guard against and/or prevent any damage, failure, and/or any other condition which may compromise the acceptable use, operation, and condition of the first and second cables 144, 146, as well as the machine 100 and systems thereof, including, in part, the implement system 120 according to the various embodiments as disclosed herein.

The controller 232 can continually receive, monitor, and process the signals, data, information, and the like as disclosed according to any embodiment herein, including signals electronically received from the sensors 230, to thus continually monitor the operation, condition, stresses, forces, and the like associated with the first and second cables 144, 146 to determine the operational status (as well as, in an additional embodiment, the remaining useful life) thereof, in real time, as disclosed herein. In response to a determination by the controller 232 of the operational status of the first cable 144 and/or the second cable 146 to be acceptable or satisfactory according to any of the embodiments above, the controller 232 can continue to monitor the operational status of the first and second cables 144, 146, as disclosed herein. The controller 232 can additionally generate and electronically transmit one or more command signals (which can include any associated data, etc.) to actuate the display unit 106 of the operator station 116 as well as, in certain embodiments, any one or more additional suitable devices of the operator station 116 configured to provide the operator with information, notifications, and alerts which can include one or more of textual or visual alerts, audio alerts, and/or tactile/vibrational alerts indicative of the acceptable or satisfactory operating condition of the first cable 144 and/or the second cable 146. Specifically, in one embodiment, in response to such command signals (which can include any associated data, etc.) transmitted thereto from the controller 232 (which can be via the communication device 236), the display unit 106 can be actuated to provide the operator with notification of the acceptable or satisfactory operating condition of the first cable 144 and/or the second cable 146 as well as the remaining useful life associated therewith, including, in part, by displaying textual, graphic, and/or visual words, symbols, numbers, and/or other indicia indicative of the first and second cables 144, 146 as well as the accompanying acceptable or satisfactory operating condition (and the remaining useful life) thereof, such as, e.g., by displaying a green light, the term "acceptable" or "satisfactory", or the like, as well as the remaining useful life percentage displayed as a numerical percentage value and/or as a graphical bar, dial, chart, or the like, associated with each of the first and second cables 144,146.

In response to a determination of the operational status of any one or more of the first cable 144 and the second cable 146 to be unacceptable as determined by the controller 232 (and/or a remaining useful life of zero percent (0%)) according to and consistent with any of the embodiments as disclosed above, the controller 232 can responsively generate and electronically transmit one or more command signals (which can include any associated data, etc.) to actuate the display unit 106 (as well as any other suitable devices of the operator station 116) to provide the operator with notification of the unacceptable operating condition of the first cable 144 and/or the second cable 146 which, addition to displaying textual, graphic, and/or visual words, symbols, numbers, and/or other indicia indicative of the unacceptable operating condition as associated with the corresponding, applicable one or more of the first and second cables 144, 146 as discussed above, modified, different, and/or additional notifications can be provided. In particular, to provide an non-limiting example, the green light displayed by the display unit 106 may turn to red and may flash, the term "unacceptable" may be displayed in one or more of red font, red flashing font, and/or larger font, and additional notifications may be provided by the display unit 106, including one or more of textual or visual alerts, audio alerts, and/or tactile/vibrational alerts, as well as visual, textual, and/or audio instructions informing the operator of the unacceptable condition as well as any necessary measures or actions to take in response thereto. In embodiments wherein the controller 232 calculates and determines the remaining useful life of the first and second cables 144, 146, the display unit 106 can additionally be actuated to display the indicia of the remaining useful life percentage in a corresponding manner, e.g., the displayed numerical percentage value and/or graphical bar, dial, chart, or the like, associated with each of one or more of the first and second cables 144, 146 having an unacceptable operating condition can be, e.g., displayed in one or more of red font, red flashing font, and/or larger font.

In an additional embodiment, and in addition to providing the notification as disclosed above, immediately upon the determination by the controller 232 of the unacceptable operating condition (and/or a remaining useful life of zero percent (0%), as determined consistent with any of the embodiments herein) of any one or more of the first and second cables 144, 146, the controller 232 can generate and electronically transmit one or more command signals to one or more of the components of the implement system 120, the hydraulic system 208, and/or the machine 100 to deactivate or otherwise control the actuation thereof in order to prevent any damage thereto. In one embodiment, upon the determination of the unacceptable operating condition, the controller 232 can generate and electronically transmit one or more command signals to deactivate the operation of the first pump 222 or actuate the displacement of the first pump 222 to a zero displacement mode. The controller 232 can additionally generate and electronically transmit one or more command signals to the valves of the hydraulic system 208, including, in part, the pressure relief valves 220a, 220b, and/or those of the one or more valves 226, to relieve and direct the tension-inducing pressure out of, and prevent any pressurized fluid from being fluidly communicated into the corresponding, respective second fluid chambers 205, 205' to thus disengage or deactivate the corresponding, respective tensioning devices 140, 142 connected to the corresponding, respective first cable 144 and second cable 146 having an operating condition determined as unacceptable. Alternatively, upon one of the first and second cables 144, 146 having an operating condition determined as unacceptable, the controller 232 can responsively generate and electronically transmit one or more command signals to the valves, including, in part, the one or more valves 226 as discussed above, to deactivate both of the tensioning devices 140, 142. Furthermore, in an additional embodiment, upon at least one of the first and second cables 144, 146 having an operating condition determined as unacceptable, the controller 232 can generate and electronically transmit one or more command signals to deactivate the operation of the second pump 224, actuate the second pump 224 to a locked or safe mode, or any other mode which would prevent movement of the drill head 152 to thus prevent any further tension-inducing stress and any additional and/or alternative forces from being transmitted to or otherwise experienced by the one or more of the first and second cables 144, 146 having an unacceptable operating condition.

If, based upon the reception and/or monitoring of the signals sensed and/or detected by one or more of the one or more sensors 230 as well as the processing and analysis thereof according to any embodiment as disclosed herein, the controller 232 determines, designates, or otherwise defines the operational status of any one or more of the first cable 144 and the second cable 146 as a caution or warning status as disclosed herein, the controller 232 can responsively generate and electronically transmit one or more command signals (which can include any associated data, etc.) to actuate the display unit 106 (as well as any other suitable devices of the operator station 116) to provide the operator with notification of the caution or warning operating condition of the corresponding one or more of the first cable 144 and/or the second cable 146. In response to receiving such signals from the controller 232, the display unit 106 (as well as any other suitable devices of the operator station 116) can be actuated to display textual, graphic, and/or visual words, symbols, numbers, and/or other indicia indicative of the caution or warning operating condition as associated with the corresponding, applicable one or more of the first and second cables 144, 146 as discussed above, modified, different, and/or additional notifications can be provided. In particular, in one example, the green light displayed by the display unit 106 as discussed above may turn to orange or yellow and may flash, the term "caution" or "warning" may be displayed in one or more of orange font, yellow font, orange flashing font, yellow flashing font, and/or larger font, and additional notifications may be provided by the display unit 106, including one or more of textual or visual alerts, audio alerts, and/or tactile/vibrational alerts, as well as visual, textual, and/or audio instructions informing the operator of the caution or warning operating condition as well as any necessary measures or actions to take in response thereto. In an additional embodiment, the controller 232 can responsively generate and electronically transmit one or more command signals (which can include any associated data, etc.) to actuate the display unit 106 (as well as any other suitable devices of the operator station 116) to provide the operator with notification of the caution or warning operating condition in a manner consistent with the foregoing discussion upon the determination by the controller 232 of the remaining useful life percentage value of one or more of the first cable 144 and the second cable 146 approaching a remaining useful life percentage value of zero percent (0%) and at or within a proximate, critical range thereto, which, in one example, can be upon the determination of a remaining useful life of less than or equal to one of twenty percent (20%), ten percent (10%) and five percent (5%). In addition, the displayed numerical percentage value and/or graphical bar, dial, chart, or the like, associated with the remaining useful life display of the one or more of the first and second cables 144,146 having a remaining useful life percentage value at or within the proximate, critical range of zero percent (0%), as discussed above, can be, e.g., displayed in, e.g., orange font, yellow font, orange flashing font, yellow flashing font, and/or larger font.

Simultaneously to and in combination with the monitoring, reception, and processing of any of the various signals, measurements, data, and/or values from one or more of the one or more sensors 230 and/or stored in the memory 234 in connection with the monitoring of the first and second cables 144, 146 by the controller 232 according to any embodiment as disclosed herein, the cable monitoring system 121 and, in part, the controller 232 thereof, can additionally and responsively control the actuation of the components of the implement system 120, cable feed system 148, and the hydraulic system 208 to prevent the first and second cables 144, 146 from experiencing any stresses, forces, and/or other conditions which may compromise the acceptable use, operation, and condition of the first and second cables 144, 146 and result in an unacceptable operating condition thereof. In one embodiment, concurrently with and based upon the processing and analysis of the signals indicative of any reduction in tensioning force of the first cable 144 and/or the second cable 146 (e.g., the signal indicative of the degree of reduction in tension force as detected by the respective, corresponding first sensor 230a/second sensor 230b, and additionally, or alternatively, the signal indicative of the degree of the reduction in pressure as detected by the respective, corresponding first pressure sensor 238a/second pressure sensor 238b) according to the embodiments as discussed above, in combination with the determination of the degree of incremental increase '$\Delta L1$'/'$\Delta L2$' beyond the first cable length 'L1'/second cable length 'L2', (or, in certain embodiments, any additional, subsequent incremental increases '$\Delta L1_2$', '$\Delta L1_3$' ... '$\Delta L1_n$'/'$\Delta L2_2$', '$\Delta L2_3$' ... '$\Delta L2_n$') and the comparison thereof with respect to the threshold value (and the resultant determination of the operating condition and/or remaining useful life) according to any embodiment as disclosed herein, the controller 232 can responsively and correspondingly modify (or reduce) the calculated tensioning force and the resultant, corresponding tensioning force actuation signals to be applied to the first cable 144 via the first tensioning device 140 and/or to be applied to the second cable 146 via the second tensioning device 142, as disclosed above, such that the respective, corresponding first tensioning device 140/second tensioning device 142 are prevented from actuation which retracts, stretches, and/or imparts tension or similar force upon the first cable 144 or the second cable 146 which would result in any additional incremental increase in the respective length of the first cable 144 and/or the second cable 146 which would exceed the threshold value thereof.

In yet another embodiment, the controller 232 can continuously calculate and update the operating condition and/or the remaining useful life of each of the first and second cables 144, 146 as well as the forces and stresses (e.g., sensed tension force values) experienced by each of the first and second cables 144, 146 continuously and in real time according to any embodiment as discussed herein, and can responsively control the actuation and operation of the components of the implement system 120, cable feed system 148, and/or the hydraulic system 208 such that such systems are prevented from actuation which retracts, stretches, and/or imparts tension or similar force upon the first cable 144 or the second cable 146 which would result in any additional incremental increase in the respective length of the first cable 144 and/or the second cable 146 which would exceed the threshold value thereof. Specifically, in one example, the controller 232, based upon the current remaining useful life and/or operating condition of each of the first and second cables 144, 146 and the relationship thereof with respect to each corresponding threshold value and/or the corresponding maximum tension value ($T_{MAX}$), the controller 232 can continuously monitor the tension forces applied to the first and second cables 144, 146 (e.g., via the respective, corresponding first sensor 230a/second sensor 230b), and can responsively generate and electronically transmit one or more command signals to control the components of the implement system 120, cable feed system 148, and/or the hydraulic system 208, including but not limited to the first pump 222, second pump 224, as well as any one or more of the valves, as disclosed herein (including, in part, the one or more valves 226), to limit and/or prevent any actuation of any one or more of such components which results in the application of a tension force equivalent to the maximum tension value ($T_{MAX}$), or within a range thereof (e.g., one of fifteen percent (15%), ten percent (10%), and five percent (5%)) being applied to either of the first and second cables 144, 146.

Figure 8:
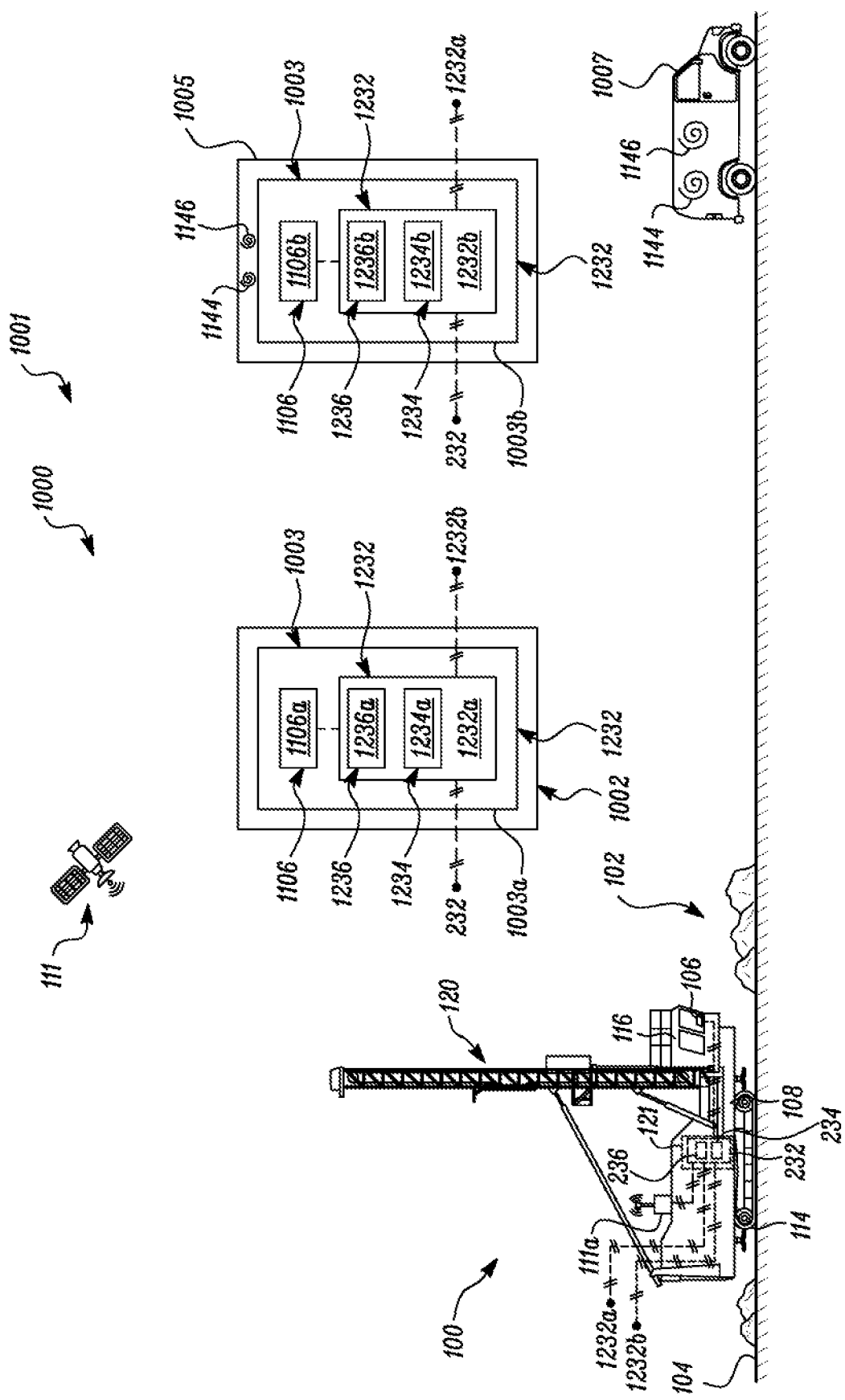
FIG. 8 depicts a schematic and diagrammatic illustration of a machine management system as well as a distribution and supply system associated with the machine and cable monitoring system thereof, in accordance with an embodiment of the present disclosure.

In yet another embodiment of the present disclosure as illustrated in FIG. 8, the machine 100 as well as the cable monitoring system 121, and the controller 232 thereof, can be connected in electronic communication (e.g., via the communication device 236) with a machine management system 1000. The machine management system 1000 can include, in part, a distribution and supply system 1001, and can be embodied as including, in part, a network of a plurality of electronically and communicatively connected network terminals 1003 (including, at least in part, a machine management network terminal 1003a, and a distribution and supply network terminal 1003b, as discussed herein), each including at least in part, a controller 1232, a memory 1234, a communication device 236, and a display unit 1106. Each controller 1234, memory 1234, communication device 1236, and display unit 1106 (including each controller 1232a, 1232b, memory 1234a, 1234b, communication device 1236a, 1236b, and display unit 1106a, 1106b, as discussed herein), are embodied as consistent with, and include at least the features, functionalities, and capabilities which are equivalent to those of the controller 232, memory 234, communication device 236, and display unit 106 of the machine 100, as disclosed above; as a result, the disclosures of the controller 232, memory 234, communication device 236, and display unit 106 of the machine 100 according to the embodiments discussed above apply equally to and are incorporated by reference as equivalently applicable to each controller 1232, 1232a, 1232b, memory 1234, 1234a, 1234b, communication device 1236, 1236a, 1236b, and display unit 1106, 1106a, 1106b. In particular, each display unit 1106, 1106a. 1106b can be embodied as an input and display unit as including the functionalities, capabilities, and interface format of a tablet computing device (or otherwise consistent therewith), and can be connected in electronic communication with the controller 232 of the machine 1000, as well as the controllers 1232, 1232a, 1232b of the other machine management network terminals 1003 (as further disclosed herein) such that, through each display unit 1106, 1106a, 1106b, an operator, administrator, and/or system personnel can electronically transmit and receive data, information, notifications, and alerts as well as commands to, from, and between the various systems of the machine 100 including but not limited to the cable monitoring system 121, as well as the machine management system 1000 and the distribution and supply system 1001.

The machine management and control site 1002 can located at the worksite 102, or alternatively may be located remotely from the worksite 102. The machine management and control site 1002 includes a machine management network terminal 1003a, which includes a controller 1232a, a memory 1234a, a communication device 1236a and display unit 1106a as discussed above. The machine management system 1000, and, in particular, the distribution and supply system 1001 thereof, can include at least one distribution and supply site 1005 (or a plurality thereof), which each of the at least one, or the plurality of, distribution and supply sites 1005 can be embodied as a distribution and supply facility having an inventory of replacement parts and components, including but not limited to a plurality of replacement first and second cables 1144, 1146. Each of the least one distribution and supply site 1005 includes a distribution and supply network terminal 1003b, which includes a controller 1232*b*, a memory 1234*b*, a communication device 1236*b*, and display unit 1106*b* as discussed above.

The machine 100 as well as the cable monitoring system 121, and specifically, the controller 232 thereof, can be connected in electronic communication with each controller 1232*a*, 1232*b* and display unit 11069, 1106*b* of the machine management network terminal 1003*a* of the machine management and control site 1002 and the distribution and supply network terminal 1003*b* of the distribution and supply site 1005 (e.g., via the respective communication device 236, 1236*a*, 1236*b*), respectively, to electronically transmit the current operating condition and/or the remaining useful life of each of the first and second cables 144, 146 of the machine 100 as determined by the controller 232 according to any embodiment, as disclosed herein, to each of the respective, corresponding controllers 1232*a*, 1232*b*, as well the one or more command signals (which can include any associated data, etc.) to actuate the respective, corresponding display units 1106*a*, 1106*b* to provide notification of and to display the current operating condition and/or the remaining useful life of the corresponding one or more of the first cable 144 and/or the second cable 146 in a manner consistent with and equivalent to that as displayed by the display unit 106 of the machine 100 as discussed above.

In addition to electronically transmitting the current operating condition and/or the remaining useful life of each of the first and second cables 144, 146 of the machine 100, the controller 232 can additionally electronically transmit one or more signals indicative of a current location of the machine 100 as determined by a global positioning system transreceiver 111*a* of a global positioning system 111, or any other suitable device and/or system capable of determining a location of the machine 100, positioned on the machine 100 and electronically and communicatively connected to the controller 232, to at least one of, or each of the controller 1232*a* of the machine management network terminal 1003*a* of the machine management and control site 1002 and the controller 1232*b* of the distribution and supply network terminal 1003*b* of the distribution and supply site 1005.

In response, the machine management system 1000, and, in particular, the distribution and supply system 1001 thereof can deploy one or more, or at least one mobile service transport vehicle 1007 (e.g., a truck, a locomotive, a marine vehicle, a drone, etc.) to provide one or more of a replacement first cable 1144 and a replacement second cable 1144, 1146 to the location of the machine 100 at the worksite 102 upon or prior to a determination by the controller 232 of an unacceptable operating condition of the respective, corresponding, applicable one or more of the first cable 144 and the second cable 146. In particular, based upon the processing and analysis of one or more of, and in one embodiment, each of, the current operating condition and/or the remaining useful life of the first cable 144 and the second cable 146 of the machine 100, the current location of the machine 100 and/or worksite 102, and the current location of and distance between the machine 100 and worksite 102 and a proximate one of the one or more distribution and supply sites 1005 having an inventory of at least one replacement first and/or second cables 1144, 1146, and, in a further embodiment, an estimated transportation speed of the mobile service transport vehicle 1007, the machine management system 1000, and, in particular, the distribution and supply system 1001 can deploy one or more, or at least one mobile service transport vehicle 1007 (e.g., a truck, a locomotive, a marine vehicle, a drone, etc.) from the proximate distribution and supply site 1005 having an inventory of at least one replacement first and/or second cables 1144, 1146 to provide one or more of a replacement first cable 1144 and a replacement second cable 1144, 1146 to the location of the machine 100 at the worksite 102 upon or prior to a determination by the controller 232 of an unacceptable operating condition of the respective, corresponding, applicable one or more of the first cable 144 and second cable 146.

While aspects of the present disclosure have been particularly shown and described with reference to the embodiments above, it will be understood by those skilled in the art that various additional embodiments can be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for monitoring a cable of an implement system, the implement system including, a drilling device, a tensioning device, and the cable, the cable coupled to the drilling device and the tensioning device in a taut configuration to define a first length, the method comprising:
   determining, by a controller, an increment in the first length of the cable;
   comparing, by the controller, the increment in the first length with a threshold value;
   generating, by the controller, a warning signal if a magnitude of the increment is greater than the threshold value;
   determining, by the controller, a remaining useful life of the cable; and
   controlling operation of the implement system based on the remaining useful life of the cable.

2. The method of claim 1 wherein determining the increment in the first length of the cable includes:
   receiving, by the controller, a magnitude of tension in the cable from a sensor positioned on the tensioning device; and
   calculating, by the controller, the increment in the first length of the cable based on the magnitude of tension.

3. The method of claim 1 wherein determining the increment in the first length of cable includes:
   determining, by the controller, a second length of the cable;
   comparing, by the controller, the second length with the first length to determine the increment in the first length of the cable.

4. The method of claim 1 wherein determining the remaining useful life of the cable is based on one or more parameters associated with the cable wherein the one or more parameters include tension in the cable, the increment in the first length of the cable and a load on the cable.

5. The method of claim 1 wherein the warning signal is configured to display a warning image and/or to trigger an audio alarm.

6. The method of claim 1 wherein the controller is configured to control the operation of the implement system to limit an application of a tension force in the cable based on the remaining useful life of the cable.

7. The method of claim 1 further including generating a notification of the remaining useful life of the cable.

8. An implement system for a drilling machine comprising:
   a drilling device;
   a tensioning device;
   a cable coupled to the drilling device at one end and the tensioning device at a second end in a taut configuration to define a first length, the cable configured to move the drilling device with respect to a ground surface;

a sensor positioned on the tensioning device and in communication with the cable, the sensor configured to detect one or more parameters associated with the cable; and a controller communicably coupled to the sensor, the controller configured to:
determine an increment in the first length of the cable;
compare the increment in the first length with a threshold value;
generate a warning signal if a magnitude of the increment is greater than the threshold value;
determine a remaining useful life of the cable; and
control the implement system based on the determined remaining useful life of the cable.

9. The implement system of claim 8 wherein the tensioning device includes:
a cylinder; and
a piston coupled to the cable and in communication with the sensor.

10. The implement system of claim 8 wherein the controller is further configured to:
receive a magnitude of tension in the cable from the sensor; and
determine the increment in the first length of the cable based on the magnitude of tension.

11. The implement system of claim 8 wherein the controller is further configured to:
determine a second length of the cable; and
compare the second length of the cable with the first length to determine the increment in the first length of the cable.

12. The implement system of claim 8 wherein the controller is further configured to:
receive the one or more parameters associated with the cable from the sensor, wherein the one or more parameters include tension in the cable, the increment in the first length of the cable, and a load on the cable; and
determine the remaining useful life of the cable based on the one or more parameters of the cable.

13. The implement system of claim 8 wherein the warning signal is configured to:
display the warning signal on a display unit of the drilling machine; and/or
trigger an audio alarm within an operator cabin of the drilling machine.

14. The implement system of claim 8 wherein the controller is further configured to generate a notification of the remaining useful life of the cable.

15. A drilling machine comprising:
a frame;
a mast mounted on the frame;
a rotary head movable along the mast;
a drilling tool coupled to the rotary head, the drilling tool configured to rotate upon being engaged by the rotary head;
one or more cables coupled to the rotary head for moving the rotary head relative to the mast;
one or more tensioning devices coupled to the one or more cables, the one or more tensioning devices configured to remove slack created in the one or more cables;
a sensor communicably coupled with the one or more cables, the sensor configured to detect one or more parameters associated with each cable of the one or more cables, wherein the one or more parameters include tension in the cable, the increment in length of each cable, and a load on the cable; and
a controller communicably coupled to the sensor, the controller configured to:
determine an increment in length of each cable based on the one or more parameters associated with each cable;
compare the increment in length of each cable with a threshold value;
generate a warning signal if the increment in length of at least one cable of the one or more cables is greater than the threshold value;
receive the one or more parameters associated with each cable from the sensor;
determine a remaining useful life of each cable based on the one or more parameters of each cable; and
control operation of implement system based on the remaining useful life of the one or more cables.

16. The drilling machine of claim 15 wherein each tensioning device of the one or more tensioning devices includes:
a cylinder; and
a piston being in communication with the sensor.

17. The drilling machine of claim 15 wherein the controller is configured to:
receive a magnitude of tension in each cable from the sensor; and
calculate the increment in length of each cable based on the magnitude of tension.

18. The drilling machine of claim 15 wherein the controller is configured to:
determine a new length of each cable; and
compare the new length of each cable with an original length to determine the increment in the original length of each cable.

19. The drilling machine of claim 15 wherein the warning signal is configured to:
display the warning signal on a display unit of the drilling machine; and/or
trigger an audio alarm within an operator cabin of the drilling machine.

20. The drilling machine of claim 15 wherein the controller is further configured to generate a notification of the remaining useful life of the cable.

* * * * *